(12) United States Patent
Pollino et al.

(10) Patent No.: US 11,999,825 B2
(45) Date of Patent: Jun. 4, 2024

(54) END-CAPPED POLY(ARYL ETHER SULFONE) POLYMERS, POLY(ARYL ETHER SULFONE) BLOCK COPOLYMERS, AND CORRESPONDING SYNTHESIS METHODS

(71) Applicant: SOLVAY SPECIALTY POLYMERS USA, LLC, Alpharetta, GA (US)

(72) Inventors: Joel Pollino, Johns Creek, GA (US); Stéphane Jeol, Wassy (FR); Kelly D. Branham, Woodstock, GA (US); Matthew Booher, Canton, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 853 days.

(21) Appl. No.: 17/043,699

(22) PCT Filed: Apr. 24, 2019

(86) PCT No.: PCT/EP2019/060543
§ 371 (c)(1),
(2) Date: Sep. 30, 2020

(87) PCT Pub. No.: WO2019/207013
PCT Pub. Date: Oct. 31, 2019

(65) Prior Publication Data
US 2021/0139650 A1    May 13, 2021

Related U.S. Application Data

(60) Provisional application No. 62/663,034, filed on Apr. 26, 2018.

(30) Foreign Application Priority Data
Jul. 17, 2018 (EP) ..................... 18183930

(51) Int. Cl.
*C08G 75/23* (2006.01)
*C08L 77/02* (2006.01)

(52) U.S. Cl.
CPC .............. *C08G 75/23* (2013.01); *C08L 77/02* (2013.01)

(58) Field of Classification Search
CPC ...... C08G 2261/516; C08G 2261/1452; C08G 2261/722; C08G 18/0828; C08G 75/23; C08G 75/20; H01B 1/122; H01M 8/1025; H01M 8/1027; C08L 81/06
See application file for complete search history.

(56) References Cited

U.S. PATENT DOCUMENTS

| | | | | |
|---|---|---|---|---|
| 4,562,243 A | * | 12/1985 | Percec | C08G 75/02 528/212 |
| 2006/0122316 A1 | * | 6/2006 | Snider | C08L 23/286 524/502 |
| 2007/0207361 A1 | * | 9/2007 | Yamashita | H01M 8/1025 429/492 |

FOREIGN PATENT DOCUMENTS

| | | | |
|---|---|---|---|
| CN | 101016284 A | 8/2007 | |
| EP | 2189487 A1 | 5/2010 | |
| TW | 201311748 | * 3/2013 | ............... C07F 4/69 |
| WO | 2005059007 A1 | 6/2005 | |

OTHER PUBLICATIONS

Williams F.J. et al., "A direct synthesis of phenoxy-substituted phthalic anhydrides by aromatic nucleophilic displacement", The Journal of Organic Chemistry 1977, vol. 42, No. 21, p. 3425-3431.

* cited by examiner

*Primary Examiner* — Shane Fang
(74) *Attorney, Agent, or Firm* — Osha Bergman Watanabe & Burton LLP

(57) ABSTRACT

Described herein are end-capped poly(aryl ether sulfone) ("PAES") polymers and corresponding synthesis methods. The end-capped PAES polymers are end-capped by functionalizing a PAES polymer with a halophthalic diialkyl ester end-capping agent. It was surprisingly discovered that the resulting dialkyl phthalate end-capped PAES polymers could be synthesized with significantly improved end-capping conversion rates, relative to end-capped PAES polymers directly functionalized with traditional phthalic anhydride end-capping agents. It was also surprisingly found that by heating the isopropyl phthalate end-capped PAES polymers, the polymers could be converted to the corresponding phthalic anhydride end-capped PAES polymers, yielding a more efficient synthetic route to phthalic anhydride end-capped PAES polymers.

18 Claims, No Drawings

END-CAPPED POLY(ARYL ETHER SULFONE) POLYMERS, POLY(ARYL ETHER SULFONE) BLOCK COPOLYMERS, AND CORRESPONDING SYNTHESIS METHODS

CROSS-REFERENCE TO RELATED APPLICATIONS

This application is a U.S. national stage entry under 35 U.S.C. § 371 of International Application No. PCT/EP2019/060543 filed Apr. 24, 2019, which claims priority to U.S. provisional application U.S. 62/663,034, filed on Apr. 26, 2018 and to European patent application EP 18183930.9, filed on Jul. 17, 2018, the whole content of each of these applications being incorporated herein by reference for all purposes.

FIELD OF THE INVENTION

The invention relates to end-capped poly(aryl ether sulfone) ("PAES") polymers and to corresponding synthesis methods that have excellent conversion rates. The invention further relates to PAES block copolymers and to methods of synthesizing the PAES block copolymers.

BACKGROUND OF THE INVENTION

Poly(aryl ether sulfone) ("PAES") block copolymers of are significant commercial interest. PAES block copolymers combine the desirable performance of the PAES block (e.g. hydrolysis resistance, high thermal resistance—Tg—and stability, and chemical stability) with the performance of a second polymer (for instance flexibility provided by polydimethylsiloxane, hydrophilic behavior provided by polyethylene glycol, and resistance to chlorinated solvents provided by polyamide). The PEAS block copolymers are therefore desirable in a wide range of application settings including, but not limited to, membranes (hydrophilic and hydrophobic membranes), mutomotive (flexible and high impact ducts), aerospace (thermoplastic elastomer), and healthcare instruments (soft touch PAES).

DETAILED DESCRIPTION OF THE INVENTION

Described herein are end-capped poly(aryl ether sulfone) ("PAES") polymers and corresponding synthesis methods. The end-capped PAES polymers are end-capped by functionalizing a PAES polymer with a halophthalic diialkyl ester end-capping agent. It was surprisingly discovered that the resulting dialkyl phthalate end-capped PAES polymers could be synthesized with significantly improved end-capping conversion rates, relative to end-capped PAES polymers directly functionalized with traditional phthalic anhydride end-capping agents. End-capping conversion rate refers to the ratio of (1) the number of moles of reactive end-groups (generally, phenolic OH) on a polymer that have been end-capped with the end-capping agent after functionalization with the end-capping agent relative to (2) the number of moles of those reactive end groups prior to functionalization with the end-capping agent. End-capping conversion rates can be measure as described in the examples below. It was also surprisingly found that by heating the isopropyl phthalate end-capped PAES polymers, the polymers could be converted to the corresponding phthalic anhydride end-capped PAES polymers, yielding a more efficient synthetic route to phthalic anhydride end-capped PAES polymers. Furthermore, the high end-group conversion efficiency for polymers end capped with halophthalic dialkyl ester end-capping agents, and for phthalic anhydride end-capped polymers made from them, provides a way to access purer block copolymers with higher molecular weights and fewer unreacted chain ends compared to those synthesized from end-capped polymers with lower end-group conversion rates. Because molecular weight and material properties are inextricably linked; high end group conversion results in purer, higher molecular weight block copolymers with superior physical properties.

Phthalic anhydride end-capped PAES polymers are highly desirable because of the ease with which they form block copolymers with amine end-capped polymers ("PAES block copolymers"), especially during melt processing. More specifically, the terminal phthalic anhydride groups readily react with terminal amine groups to allow formation of the PAES block copolymers. Because of the significant reaction rate and the high strength of the imide bond formed by the reaction between the phthalic anhydride and amine groups, the PAES block copolymers can be formed using melt processing techniques. Relative to conventional block copolymer synthesis, which requires solution phase synthesis and concomitant solvent removal, coagulation, and purification, PAES block copolymer synthesis can be accomplished by simple melt processing. As an example, the phthalic anhydride end-capped PAES polymers and amine end-capped polymers can be block-copolymerized by feeding the respective powders into a melt mixer (e.g. an extruder) with or without a solvent and directly polymerized in a melt. Still further, where polymer compositions are desired, the components of the polymer composition (e.g. glass fibers, pigments, antioxidants) can also be introduced into the melt mixer and polymer compositions including the PAES block copolymers can be formed.

However, traditional methods for end-capping PAES polymers with phthalic anhydride have low end-capping conversion rates in polymer systems of interest (typically between 35% and 55%). For example, J. Org. Chem., 42, 3425 (1977), to Williams et al. ("Williams") and incorporated herein by reference, describes the reaction of 3-fluorophthalic anhydride with sodium phenoxide and reports conversion rates from 85% to 95%. However, as demonstrated in the examples below, in PAES polymer systems, end-capping conversion rates of only about 37% are achieved using halophthalic anhydrides (See Examples 5 and 6).

It was surprisingly discovered that, by end-capping PAES polymers with a halophthalate dialkyl ester end-capping agent (forming diialkyl phthalate end-capped PAES polymers), significantly increased end-capping conversion rates are achieved, while also providing identical PAEK block copolymers to those synthesized with phthalate anhydride end-capped PAES polymers. Moreover, it was also surprisingly discovered that further increases in end-capping conversion rates were achieved with the use of halophthalate dialkyl ester end-capping agents relative to chlorophthalate dialkyl ester end-capping agents. As mentioned above, the dialkyl phthalate end-capped PAES polymer can be incorporated into PAES block copolymer synthesis to achieve an increased over all synthesis efficiency. The PAES block copolymers formed from the condensation reaction between (1) dialkyl phthalate end-capped PASE polymers and amine end-capped polymers and (2) corresponding dialkyl phthalate anhydride end-capped PAES polymers and amine end-capped polymers are identical. Accordingly, at least because the diialkyl phthalate end-capped PAES synthesis has a significantly increased end-capping conversation rate relate to the corresponding phthalate anhydride synthesis, the overall reaction efficiency is significantly increased in the former, relative to the latter.

Described below are the end-capped PAES polymers and PAES block copolymers, as well as the corresponding synthesis methods. For ease of reference, the PAES polymers and PAES block copolymers are described prior to describing the respective synthesis methods.

The End-Capped PAES Polymers

The end-capped PAES polymers described herein include a PAES polymer that is functionalized, at least at one end of the PAES polymer backbone, with a phthalate radical. As used herein, a PAES polymer refers to any polymer including more than 50 mole percent ("mol %") recurring units $R_{PAES}$, relative to the total number of recurring units in the PAES polymer. In some embodiments, the PAES polymer has, relative to the total number of recurring units in the PAES polymer, at least 60 mol %, at least 70 mol %, at least 80 mol %, at least 90 mol %, at least 95 mol %, at least 98 mol %, at least 99 mol %, or at least 99.9 mol % recurring units $R_{PAES}$.

Recurring unit $R_{PAES}$ is represented by the following formula:

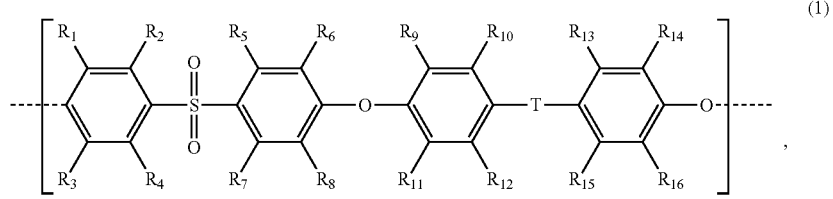

where $R_1$ to $R_{16}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; T is selected from the group consisting of a bond, —$CH_2$—; —O—; —$SO_2$—; —S—; —C(O)—; —C($CH_3$)$_2$—; —C($CF_3$)$_2$—; —C(=$CCl_2$)—; —C($CH_3$)($CH_2CH_2COOH$)—; —N=N—; —$R_aC$=$CR_b$—, (where each $R_a$ and $R_b$, are independently selected from the group consisting of a hydrogen, a $C_1$-$C_{12}$-alkyl, a $C_1$-$C_{12}$-alkoxy, and a $C_6$-$C_{18}$-aryl group); —($CH_2$)$_m$— and —($CF_2$)$_m$— (where m is an integer from 1 to 6); an aliphatic divalent group, linear or branched, of up to 6 carbon atoms; and combinations thereof. As used herein, a dashed bond ("- - - -") represents a bond to an atom outside the drawn structure (e.g. a bond to another recurring unit $R_{PAES}$, a different recurring unit the PAES polymer or to the phthalate radical end-capper). Preferably, $R_1$ to $R_{16}$ are all hydrogen. Preferably, T is selected from the group consisting of a bond, —C($CH_3$)$_2$—, and —$SO_2$— and the respective PAES polymers are poly(phenyl sulfone) ("PPSU"), polysulfone ("PSU") and poly(ether sulfone) ("PES"). In the aforementioned embodiments, preferably, $R_1$ to $R_{16}$ are all hydrogen.

In addition to recurring unit $R_{PAES}$, the end-capped PAES polymers include, at least at one end of the PAES polymer chain, an end-capper represented by either one of the following formulas:

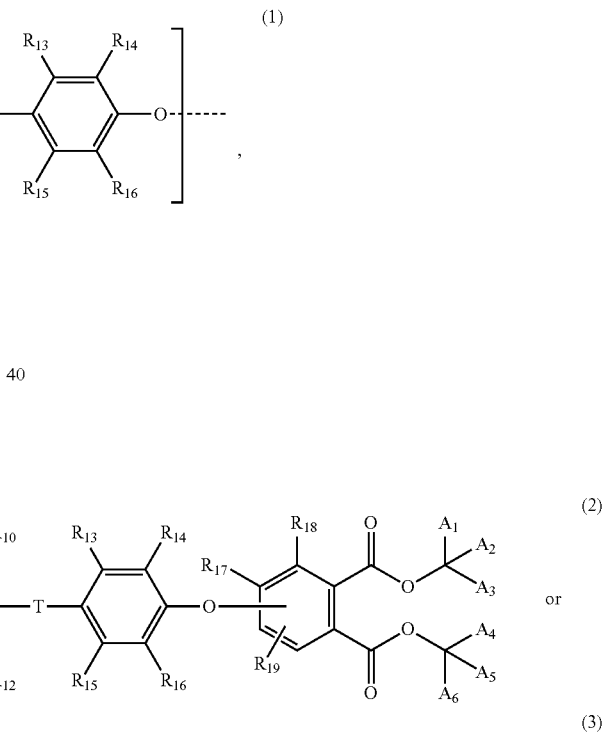

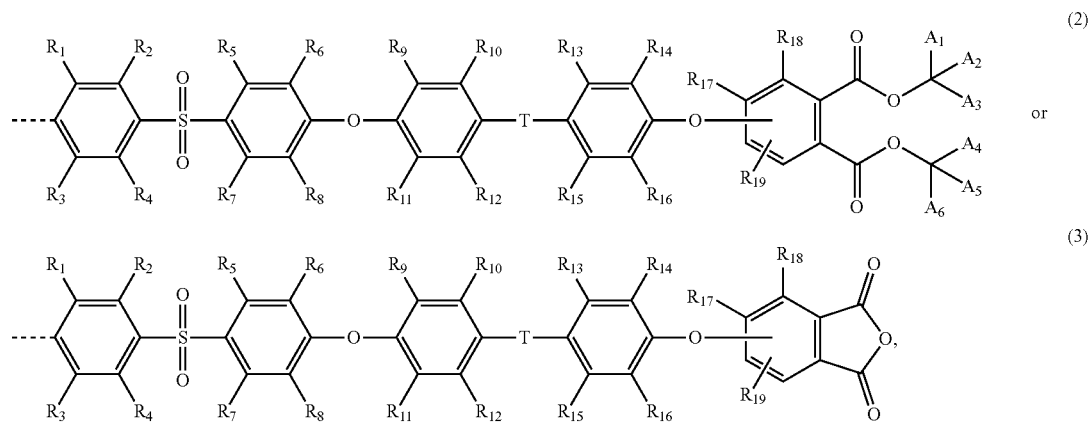

where $R_{17}$ to $R_{19}$ are independently selected from the group consisting of a hydrogen or a $C_1$ to $C_{18}$, substituted or unsubstituted, alkyl group; $A_1$, $A_2$, $A_4$, and $A_5$, are independently selected alkyl groups represented by the formula: —($CH_2$)$_n CH_3$, where n is an integer from 0 to 12; and $A_3$ and $A_6$ are independently selected form the group consisting of H and an alkyl group represented by the formula: —$(CH_2)_{n'}$·$CH_3$, where n' is an integer from 0 to 12. Preferably, $R_{17}$ to $R_{19}$ are all hydrogen. Additionally or alternatively, preferably $A_1$, $A_2$, $A_4$, and $A_5$ are all —$CH_3$ and $A_3$ and $A_6$ are both hydrogen. As used herein, end-cappers according to Formulae (2) and (3) are referred to as dialkyl phthalate radicals and phthalic anhydride radicals, respectively. Additionally, as used herein, an "end-capped PAES polymer" refers to a PAES polymer that is end-capped with a dialkyl phthalate radical or a phthalate anhydride radical; where one or the other is specifically intended, it is stated explicitly. The person of ordinary skill in the art will recognize that the end-capper incorporates a recurring unit $R_{PAES}$. Accordingly, $R_1$ to $R_{16}$ and T in Formula (1) are identical to $R_1$ to $R_{16}$ and T, respectively, in Formula (2). The aforementioned result stems from the synthesis of the end-capped PAES polymers as described in detail below.

In some embodiments, the PAES polymers are linear polymers. In such embodiments, the PAES polymers have two ends and the end-capped PAES polymer can be end-capped at one or both ends of the PAES polymer chain. In embodiments in which the end-capped PAES polymer is end-capped at only one of the PAES polymer chain, the end-capped PAES polymer is preferably end-capped with a dialkyl phthalate radical. In embodiments in which the end-capped PAES polymer is end-capped with a phthalate radical at both ends of the PAES polymer chain, it is end-capped either with a dialkyl phthalate radical at both ends, with a phthalic anhydride radical at both ends, or with a dialkyl phthalate radical at one end and a phthalic anhydride radical at the other end; preferably the PAES polymer chain is end-capped with an dialkyl phthalate radical at both ends of the PAES polymer chain. In other embodiments, the PAES polymers are hyperbranched polymers, also known as "star shaped" polymers. In such embodiments, the PAES polymers have more than two ends and the end-capped PAES polymer can be end-capped at one, some or all of the chain ends. In some embodiments, the PAES polymer is end-capped with either a dialkyl phthalate radical, a phtalic anhydride radical, or a combination thereof. Preferably, the PAES polymer is end-capped with a dialkyl phthalate radical.

In some embodiments, the end-capped PAES polymer has a number average molecular weight of at most about 20,000 grams per mole ("g/mol"), at most about 15,000 g/mol, or at most about 14,000 g/mol. Additionally or alternatively, in some embodiments, the PAES polymer has a number average molecular weight of at least 1,000 g/mol or at least 2,000 g/mol. Number average molecular weight can be measured by gel permeation chromatography ("GPC") using methylene chloride as a mobile phase, with polystyrene standard.

For clarity, in some embodiments, the PAES polymer can include recurring units other than recurring unit $R_{PAES}$. For example, in one such embodiment, the PAES polymer can further include one or more recurring units distinct from recurring unit $R_{PAES}$, and represented by Formula (1). Additionally or alternatively, in some embodiments the PAES polymer can include one or more recurring units not represented by Formula (1).

Synthesis of End-Capped PAES Polymers

The synthesis of the end-capped PAES polymers includes reacting a halophthalic dialkyl ester end-capping agent with an hydroxyl terminated PAES polymer in the presence of a base and solvent. The reaction results in formation of a dialkyl phthalate end-capped PAES polymer. Further heating of the dialkyl phthalate end-capped PAES produces the corresponding phthalic anhydride end-capped PAES polymer.

The end-capping agent used in the synthesis is a halophthalic dialkyl ester represented by the following formula:

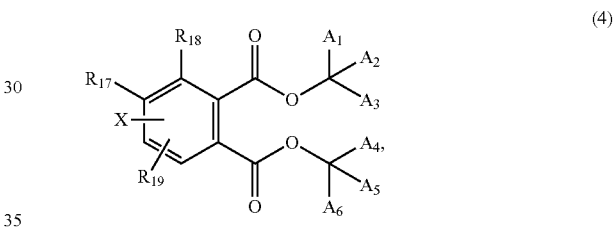

(4)

where X is either —Cl or —F, preferably —F. It was found that synthesis schemes using a halophthalic dialkyl ester as an end-capping agent had significantly increased conversion efficiency, relative to the synthesis schemes involving direct end-capping with halopthalic anhydride, as explained in detail above. Moreover, as demonstrated in the examples below, synthesis methods where X was —F, surprisingly showed further increases in conversion efficiencies, relative to analogous synthesis methods in which X was —Cl.

The synthesis of end-capped PAES polymers proceeds according to either one of the following reaction schemes:

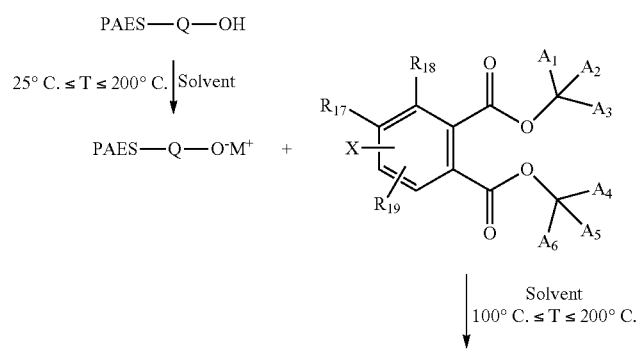

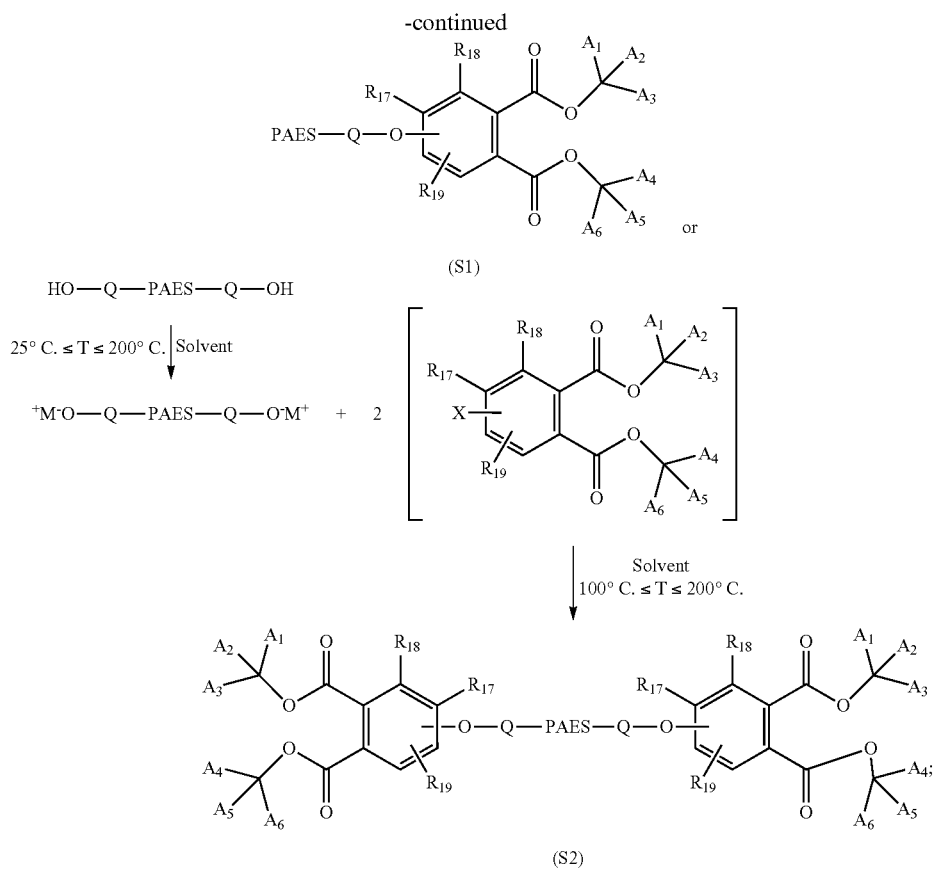

(S1)

(S2)

where PAES is the PAES polymer as defined above and Q is represented by the following formula:

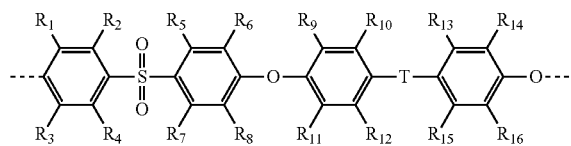

(5)

In Formula (5), the phenyl group carrying $R_{13}$ to $R_{16}$ is bonded to the oxygen in Schemes (S1) and (S2), above, while the other end of Q is bonded to the PAES polymer. The person of ordinary skill in the art will recognize that -Q-OH is a hydroxyl end-capped recurring unit $R_{PAES}$. For example, HO-Q-PAES-Q-OH and PAES-Q-OH are hydroxyl terminated PAES polymers where the PAES polymer is a linear polymer. For ease of reference, sometimes -Q-OH is referred to as a hydroxyl end-capping unit. Additionally, for inorganic bases, M is the cation of the base used, as described in detail below (e.g. PAES-Q-O$^-$M$^+$ is the conjugate base formed from the reaction of PAES-Q-OH with the base). For organic bases, M is the conjugate acid formed when the organic base deprotonates the hydroxyl terminated PAES polymer. Scheme (S1) depicts the synthesis method to end-cap the PAES polymer at one of the chain ends, while the Scheme (S2) depicts the synthesis method to end-cap the PAES polymer at both ends of the PAES polymer.

Referring to Schemes (S1) and (S2), the hydroxyl terminated PAES polymer is reacted with the halophthalic dialkyl ester end-capping agent in the presence of a base and solvent. In some embodiments, the hydroxyl terminated PAES polymer is first reacted with the base in the presence of a solvent to deprotonate the terminal hydroxyl groups and, subsequently, the deprotonated hydroxyl terminated PAES polymer is reacted with the halophthalic dialkyl ester end-capping agent in the presence of the solvent. In alternative embodiments, the hydroxyl terminated PAES polymer is reacted with the halophthalic dialkyl ester end-capping agent in the presence of the base and solvent. In either case, the deprotonation of the hydroxyl terminated PAES polymer is carried out a temperature of from about 25° C. to 200° C. and the reaction of the deprotonated hydroxyl terminated PAES polymer is carried out at a temperature from about 100° C. to about 200° C.

The base is a non-nucleophilic base that is basic enough to deprotonate a phenol, but not so strong as to deprotonate parts of the PAES backbone. Examples of suitable based include, but are not limited to, potassium t-butoxide, sodium t-butoxide, cesium t-butoxide, sodium isopropoxide, potassium isopropoxide, cesium isopropopoxide, 1,8-diazabicycloundec-7-ene ("DBU"), 1,5-Diazabicyclo(4.3.30)non-5-ene ("DBN"), N,N-diisopropylethylamine ("DIPEA"), sodium hydride, potassium hydride, sodium metal, potassium metal, $K_2CO_3$, $Na_2CO_3$, $Cs_2CO_3$, and triethyl amine. Suitable solvents include, but are not limited to, anhydrous polar aprotic solvents. In some embodiments, the polar aprotic solvent has a boiling point of at least 140° C. Examples of suitable polar aprotic solvents include, but are not limited to dimethylformamide ("DMF"), dimethylacetamide ("DMAC"), N-methyl pyrrolidone ("NMP"), hexamethylphosporic triamide ("HMPA"), DMSO, and sulfolane.

The reaction schemes described above have surprisingly high end-capping conversion rates. In some embodiments, the end-capping conversion rate is at least about 75%, at least about 80%, at least about 85%, at least about 90%, at least about 95%, or at least about 97%. Additionally or alternatively, in some embodiments, the end-capping conversion rate is no more than about 99% or no more than about 98%. Accordingly, the synthesis processes described above allows for PAES polymer powders, where at least at least 70 wt. %, at least 75 wt. %, at least 80 wt. %, at least 85 wt. %, at least 90 wt. %, at least 95 wt. %, at least 96 wt. %, at least 98 wt. % or at least 99 wt. % of the PAES polymer is an end-capped PAES polymer. As described below, such powders can be desirably incorporated into PAES block copolymer synthesis during processing of polymer compositions.

Synthesis of the phthalic anhydride end-capped PAES polymers includes heating a dialkyl phthalate end-capped PAES polymer. Without being limited by a theory, it is believed that the heating induces thermal closure of the dialkyl phthalate and concomitant formation of the corresponding phthalic anhydride end-capped PAES polymer. In some embodiments, the dialkyl phthalate end-capped PAES polymer is heated at a temperature of at least about 250° C. or at least about 260° C. While the upper temperature limit is not limited in theory, there is a practical limit, namely the decomposition temperature of the PAES polymer. In some embodiments, the dialkyl phthalate end-capped PAES polymer is heated at a temperature of no more than about 500° C., no more than about 450° C., no more than about 400° C., no more than about 350° C., no more than about 330° C., or no more than about 320° C. In some embodiments, the dialkyl phthalate end-capped PAES polymer is heated at a temperature from about 250° C. to about 500° C., from about 260° C. to about 500° C., from about 260° C. to about 450° C., from about 260° C. to about 400° C., from about 260° C. to about 350° C., from about 260° C. to about 330° C., or from about 260° C. to about 320° C. Based upon the disclosure herein, the person of ordinary skill in the art will readily know how to empirically select heating times.

PAES Block Copolymers

As noted above, PAES block copolymers can be readily synthesized by direct-reaction of the end-capped PAES polymers with amine end-capped polymers.

The PAES block-copolymers can be ABA triblock copolymers or AB multiblock copolymers. In embodiments in which the PAES block copolymers are AB multiblock copolymers, they have, relative to the total number of recurring units in the PAES block copolymer, more than 50 mol % of a recurring unit $R_{AB}$, which is represented by the following formula:

(6)

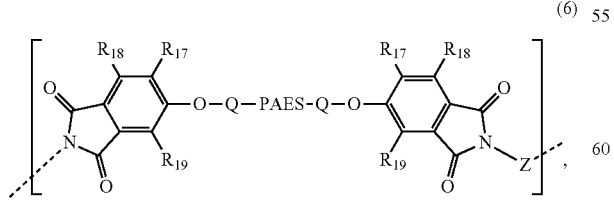

where Z is a molecule or polymer backbone. In some embodiments, the AB multiblock copolymer has at least 60 mol %, at least 70 mol %, at least 80 mol %, at least 90 mol %, at least 95 mol %, at least 98 mol %, at least 99 mol %, or at least 99.9 mol % recurring units $R_{AB}$, relative to the total number of recurring units in the block copolymer. In embodiment in which the PAES block-copolymer is an ABA triblock copolymer, it is represented by the following formula, respectively:

(7)

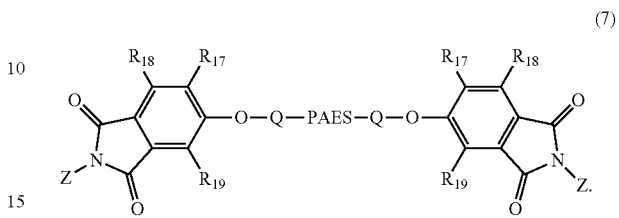

Examples of Z include, but are not limited to alkanes and polyolefins, polydimethylsiloxanes ("PDMS"), polyalkylene oxides ("PAO"), perfluoroelastomer, polyvinyl pyrrolidone, polyamides, poly(aryl ether sulfones), polyetherimides ("PEI"), polyimides, polyamideimide ("PAI"), and a poly(ether ether sulfone) ("PEES").

Alkanes and polyolefin are desirable at least because they can impart more flexibility to the resulting PAES block copolymer. Examples of embodiments in which Z is an alkane or polyolefin include, but are not limited to, those represented by the following formulae:

$$—(CR_iR_j)_n— \qquad \text{and (8)}$$

(9)

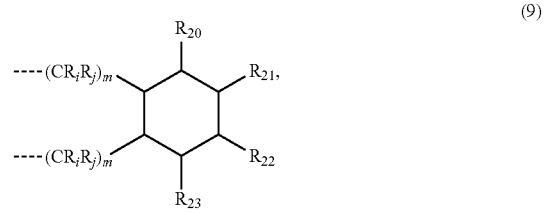

where $R_i$ and $R_j$, at each location, and $R_{20}$ to $R_{23}$ is independently selected from the group consisting of a hydrogen and a $C_1$ to $C_{18}$, substituted or unsubstituted, alkyl group; n is an integer from 1 to 400 and m is an integer from 1 to 20. With respect to Formula (8), in some embodiments, $R_i$ and $R_j$, at each location, is a hydrogen. Additionally or alternatively, n is preferably from 5 to 400. With respect to Formula (9), in some embodiments, $R_i$ and $R_j$, at each location, is a hydrogen. Additionally or alternatively, at least two of $R_{20}$, $R_{21}$, $R_{22}$ and $R_{23}$ are hydrogen. In one embodiment, Z is represented by the following formula:

(10)

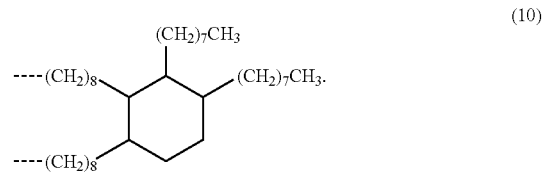

PDMS are desirable at least because they impart flexibility and toughness at low temperatures (e.g. below room temperature—below 20° C.). Examples of embodiments in which Z is a PDMS polymer include, but are not limited to, those represented by the following formula:

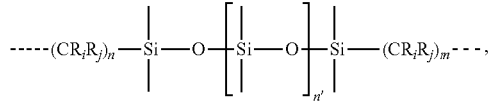

(11)

where $R_i$ and $R_j$, at each location, is independently selected from the group consisting of a hydrogen and a $C_1$ to $C_{18}$, substituted or unsubstituted, alkyl group; and n and m are independently selected integers from 1 to 18. In some embodiments, either n and m are the same; $R_i$ and $R_j$, at each location, is a hydrogen; or both. Furthermore, the PDMS polymer has a number average molecular weight of from 200 grams per mole ("g/mol") to 10,000 g/mol, from 400 g/mol to 5,000 g/mol, or from 600 g/mol to 3,000 g/mol.

PAO is desirable at least because it provides hydrophobicity to the PAES block copolymers, which makes them especially suitable for water filtration membranes and hemodialysis membranes. Examples of embodiments in which Z is a PAO include, but are not limited to, those represented by the following formula:

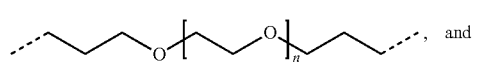

(12)

where n is an integer from 1 to 300, as well as those including either a propylene oxide backbone, an ethylene oxide backbone, or a propylene oxide and ethylene oxide backbone. Examples of the latter include those commercially available from Huntsman Corporation sold under the trade name Jeffamine® Polyetheramines.

Polyamides are desirable at least because they impart improved chemical resistance (e.g. to chlorinated solvents) to the PAES block copolymer. Examples of embodiments in which Z is a polyamide include, but are not limited to, aliphatic polyamides represented by the following formula:

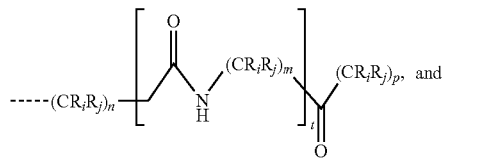

(13)

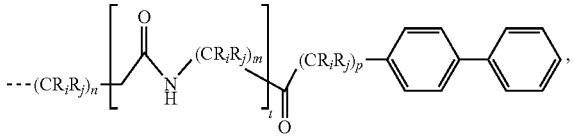

(14)

where $R_i$ and $R_j$, at each location, is independently selected from a hydrogen or a methyl group; n, m and p are independently selected integers from 1 to 16; and t is an integer from 1 to 100. In some embodiments n, m an p are all 1. Additionally or alternatively, in some embodiments, $R_i$ and $R_j$, at each location, is a hydrogen. With respect to Formula (14), there is only one bond (dashed) to an atom outside the drawn structure. Accordingly, in embodiments in which Z is represented by a Formula (16), the resulting PAES block copolymer is an ABA block copolymer. Examples of aliphatic polyamides further include, but are not limited to, PA6; PA11; PA12; PA6,6; PA6,10; PA10,10; PA10,6; PA6,12; PA12,12; PA10,12; and PA12,10. In some embodiments, Z is a semi-aromatic polyamide. Examples of semi-aromatic polyamides include, but are not limited to, polyphthalamides ("PPA"). Examples of polythalamides include, but are not limited to, PA4,T; PA5,T; PA6,T; PA8,T; PA9,T; PA10,T; PA 12,T; PA4,I; PA5,I; PA6,I; PA8,T; PA9,I; PA10,I, PA12,I; PA6,I/6,6; PA6,T/6,6; PA6,T/6,I/6,6; and PA9T/8T. Other semi-aromatic polyamides include, but are not limited to, MXD6, MXD10, PXD6 and PXD10.

PEAS and PEES are desirable at least because they retain transparency of the PAES block copolymer, as well as combine different performance profiles of the different PAES and PEES polymers. Examples of embodiments in which Z is a PAES or a PEES polymer include, but are not limited to, those represented by the formula: -PAES*- and -PEES*-. PAES* is a poly(aryl ether sulfone) polymer, distinct from the PAES polymer defined above and having, relative to the total number of recurring units in the PAES* polymer, more than 50 mol % recurring unit $R*_{PAES}$. In some embodiments, the PAES* has at least 60 mol %, at least 70 mol %, at least 80 mol %, at least 90 mol %, at least 95 mol %, at least 98 mol %, at least 99 mol %, or at least 99.9 mol % recurring units $R*_{PAES}$, relative to the total number of recurring units in PAES*. PEES* is a poly(ether ether sulfone) polymer having, relative to the total number of recurring units in the PEES* polymer, more than 50 mol % recurring unit $R*_{PEES}$. In some embodiments, the PEES* polymer has at least 60 mol %, at least 70 mol %, at least 80 mol %, at least 90 mol %, at least 95 mol %, at least 98 mol %, at least 99 mol %, or at least 99.9 mol % recurring units $R*_{PEES}$, relative to the total number of recurring units in PEES* polymer.

Recurring units $R*_{PAES}$ and $R*_{PEES}$ are represented by the following formulae, respectively:

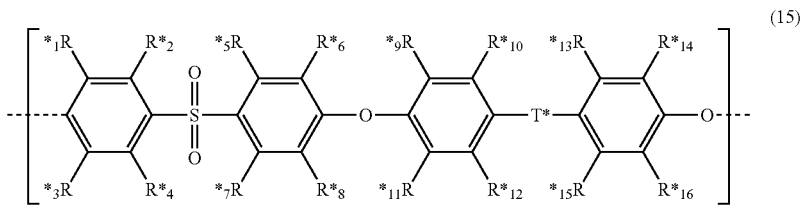

(15)

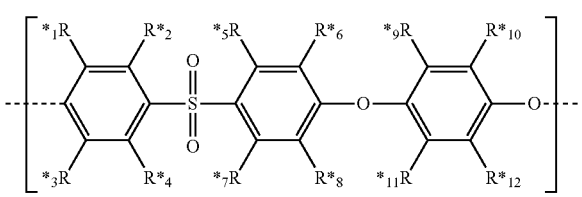

(16)

where $R^*_1$ to $R^*_{16}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium; T* is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$) (CH$_2$CH$_2$COOH)—; —N=N—; —R$_a$C=CR$_b$—, (where each R$_a$ and R$_b$, are independently selected from the group consisting of a hydrogen, a C$_1$-C$_{12}$-alkyl, a C$_1$-C$_{12}$-alkoxy, and a C$_6$-C$_{18}$-aryl group); —(CH2)m- and —(CF2)m- (where m is an integer from 1 to 6); an aliphatic divalent group, linear or branched, of up to 6 carbon atoms; and combinations thereof. Preferably, $R^*_1$ to $R^*_{16}$ are all hydrogen. Preferably, T is selected from the group consisting of a bond, —C(CH$_3$)$_2$—, and —SO$_2$— (PPSU, PSU, and PES, respectively). In the aforementioned embodiments, preferably, $R^*_1$ to $R^*_{16}$ are all hydrogen.

In some embodiments PAES* and PEES* have a number average molecular weight of at most about 20,000 g/mol, at most about 15,000 g/mol, or at most about 14,000 g/mol. Additionally or alternatively, in some embodiments, the PAES* and PEES* have a number average molecular weight of at least 1,000 g/mol or at least 2,000 g/mol. Number average molecular weight can be measured by gel permeation chromatography ("GPC") using methylene chloride as a mobile phase, with polystyrene standard.

In embodiments Z is a PEI. PEI denotes any polymer comprising at least 50 mol. %, based on the total number of moles of recurring units in the polymer, of recurring unit (R$_{PEI}$) comprising at least one aromatic ring, at least one imide group, as such and/or in its amic acid form, and at least one ether group. Recurring units (R$_{PEI}$) may optionally further comprise at least one amide group which is not included in the amic acid form of an imide group.

According to an embodiment, recurring unit (R$_{PEI}$) is selected from the group consisting of following formulas (I), (II), (III), (IV), (V) and mixtures thereof:

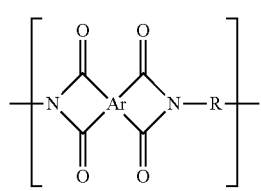
(I)

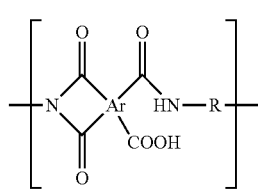
(II)

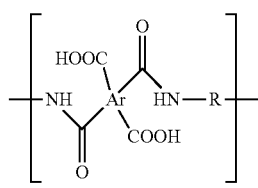
(III)

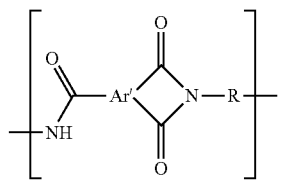
(IV)

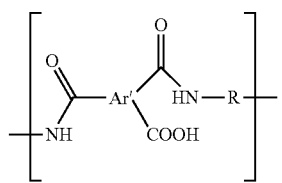
(V)

where

Ar is a tetravalent aromatic moiety and is selected from the group consisting of a substituted or unsubstituted, saturated, unsaturated or aromatic monocyclic and polycyclic group having 5 to 50 carbon atoms;

Ar' is a trivalent aromatic moiety and is selected from the group consisting of a substituted, unsubstituted, saturated, unsaturated, aromatic monocyclic and aromatic polycyclic group having from 5 to 50 C atoms; and R is selected from the group consisting of substituted and unsubstituted divalent organic radicals, for example selected from the group consisting of (a) aromatic hydrocarbon radicals having 6 to 20 carbon atoms and halogenated derivatives thereof;

(b) straight or branched chain alkylene radicals having 2 to 20 carbon atoms;

(c) cycloalkylene radicals having 3 to 20 carbon atoms, and
(d) divalent radicals of formula (VI):

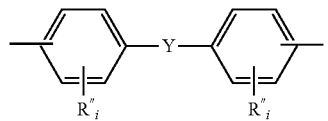

(VI)

where
Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and
R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and
i, for each R", is independently zero or an integer ranging from 1 to 4, with the proviso that at least one of Ar, Ar' and R comprise at least one ether group and that the ether group is present in the polymer chain backbone.

According to an embodiment, Ar is selected from the group consisting of formulas:

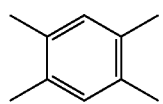

(VII)

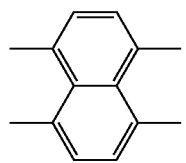

(VIII)

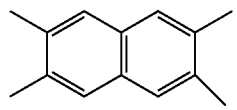

(IX)

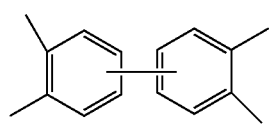

(X)

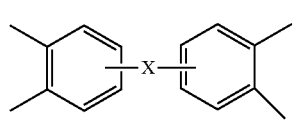

(XI)

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C—F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;
or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment, Ar' is selected from the group consisting of formulas:

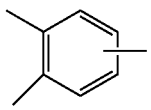

(XII)

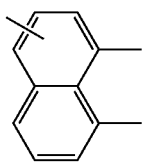

(XIII)

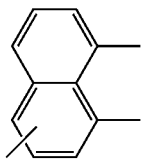

(XIV)

(XV)

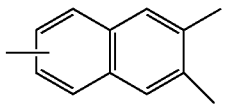

(XVI)

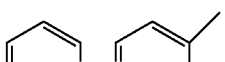

(XVII)

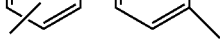

where
X is a divalent moiety, having divalent bonds in the 3,3', 3,4', 4,3" or the 4,4' positions and is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C—F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—;
or X is a group of the formula —O—Ar"—O—, wherein Ar" is a aromatic moiety selected from the group consisting of a substituted or unsubstituted, saturated, unsaturated or aromatic monocyclic and polycyclic group having 5 to 50 carbon atoms.

According to an embodiment of the present disclosure, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PEI}$) of formulas (I), (II), (III), (IV), (V) and/or mixtures thereof, as defined above.

According to an embodiment, a poly(ether imide) (PEI) denotes any polymer comprising at least 50 mol. %, based on the total number of moles in the polymer, of recurring units ($R_{PEI}$) of formula (VII):

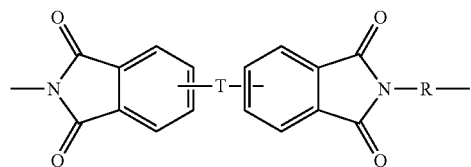

(XVIII)

where
R is selected from the group consisting of substituted and unsubstituted divalent organic radicals, for example selected from the group consisting of
(a) aromatic hydrocarbon radicals having 6 to 20 carbon atoms and halogenated derivatives thereof;
(b) straight or branched chain alkylene radicals having 2 to 20 carbon atoms;
(c) cycloalkylene radicals having 3 to 20 carbon atoms, and
(d) divalent radicals of formula (VI):

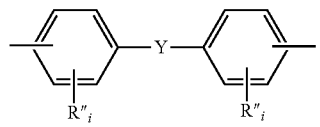

(VI)

where

Y is selected from the group consisting of alkylenes of 1 to 6 carbon atoms, for example —C(CH$_3$)$_2$ and —C$_n$H$_{2n}$— (n being an integer from 1 to 6); perfluoroalkylenes of 1 to 6 carbon atoms, for example —C(CF$_3$)$_2$ and —C$_n$F$_{2n}$— (n being an integer from 1 to 6); cycloalkylenes of 4 to 8 carbon atoms; alkylidenes of 1 to 6 carbon atoms; cycloalkylidenes of 4 to 8 carbon atoms; —O—; —S—; —C(O)—; —SO$_2$—; —SO—, and R" is selected from the group consisting of hydrogen, halogen, alkyl, alkenyl, alkynyl, aryl, ether, thioether, carboxylic acid, ester, amide, imide, alkali earth metal sulfonate, alkaline earth metal sulfonate, alkyl sulfonate, alkali earth metal phosphonate, alkaline earth metal phosphonate, alkyl phosphonate, amine and quaternary ammonium and i, for each R", is independently zero or an integer ranging from 1 to 4, with the provisio that at least one of Ar, Ar' and R comprise at least one ether group and that the ether group is present in the polymer chain backbone.

T can either be —O— or —O—Ar"—O—, wherein the divalent bonds of the —O— or the —O—Ar"—O— group are in the 3,3', 3,4', 4,3', or the 4,4' positions, and wherein Ar" is a aromatic moiety selected from the group consisting of a substituted or unsubstituted, saturated, unsaturated or aromatic monocyclic and polycyclic group having 5 to 50 carbon atoms, for example a substituted or unsubstituted phenylene, a substituted or unsubstituted biphenyl group, a substituted ou unsubstituted naphtalene group or a moiety comprising two substituted or unsubstituted phenylene.

According to an embodiment of the present disclosure, Ar" is of the general formula (VI), as detailed above; for example, Ar" is of formula (XIX):

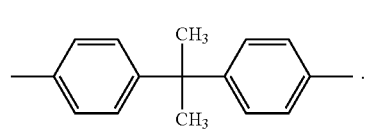

(XIX)

According to an embodiment, a poly(ether imide) (PEI) denotes any polymer comprising at least 50 mol. %, based on the total number of moles in the polymer, of recurring units ($R_{PEI}$) of formulas (XXIII) or (XXIV), in imide forms, or their corresponding amic acid forms and mixtures thereof:

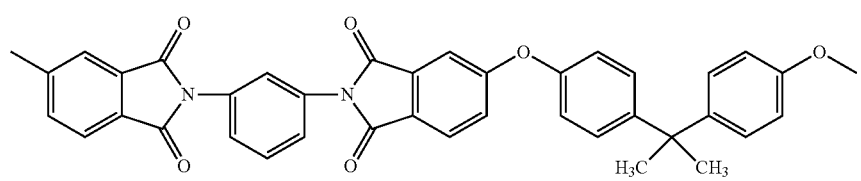

(XXIII)

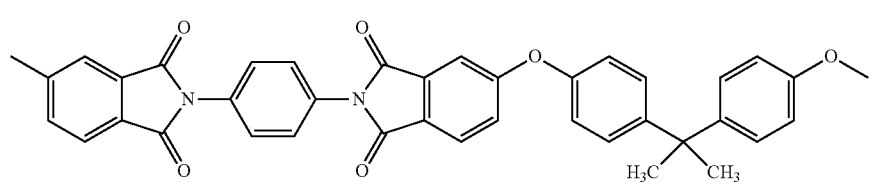

(XXIV)

In a preferred embodiment of the present invention, at least 50 mol. %, at least 60 mol. %, at least 70 mol. %, at least 80 mol. %, at least 90 mol. %, at least 95 mol. %, at least 99 mol. % or all of the recurring units in the PEI are recurring units ($R_{PEI}$) of formulas (XXIII) or (XXIV), in imide forms, or their corresponding amic acid forms and mixtures thereof.

Such aromatic polyimides are notably commercially available from Sabic Innovative Plastics as ULTEM® polyetherimides.

In a specific embodiment, the PEI polymer has a weight average molecular weight (Mw) of 10,000 to 150,000 g/mol, as measured by gel permeation chromatography, using a polystyrene standard.

In a specific embodiment, the PEI polymer has an intrinsic viscosity greater than 0.2 deciliters per gram (dl/g), beneficially 0.35 to 0.7 dl/g measured in m-cresol at 25° C.

In some embodiments, the melt flow rate or melt flow index (at 337° C. under a weight of 6.6 kg according to ASTM D1238) (MFR or MFI) of the PEI may be from 0.1 to 40 g/10 min, for example from 2 to 30 g/10 min or from 3 to 25 g/10 min.

In some embodiments, the PEI polymer has a Tg ranging from 160 and 270° C., as measured by differential scanning calorimetry (DSC) according to ASTM D3418, for example ranging from 170 and 260° C., from 180 and 250° C., or from 190 and 240° C.

In some embodiments, Z is a PAI polymer. A PAI polymer denotes any polymer comprising more than 50% moles of recurring units comprising at least one aromatic ring, at least one imide group, as such and/or in its amic acid form, and at least one amide group which is not included in the amic acid form of an imide group [recurring units ($R_{PAI}$)].

The recurring units ($R_{PAI}$) are advantageously chosen among those of formula:

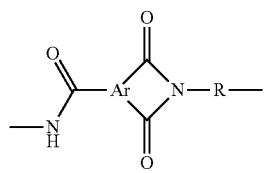

$R_{PAI}$-a
(imide form)

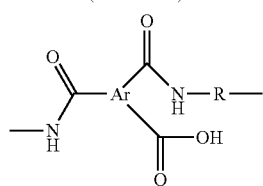

$R_{PAI}$-b
(amic acid form)

wherein:
Ar is a trivalent aromatic group; typically Ar is selected from the group consisting of following structures:

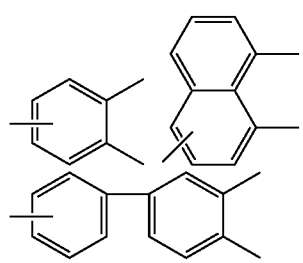

-continued

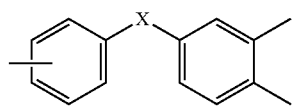

and corresponding optionally substituted structures, with X being —O—, —C(O)—, —CH$_2$—, —C(CH$_3$)$_2$—, —C(CF$_3$)$_2$—, —(CF$_2$)$_q$—, with q being an integer from 1 to 5;

R is a divalent aromatic group; typically R is selected from the group consisting of following structures:

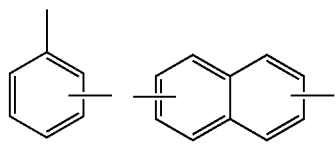

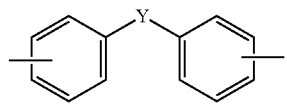

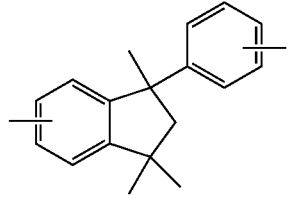

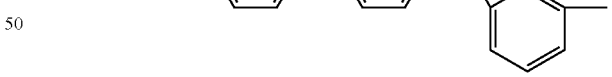

and corresponding optionally substituted structures, with Y being —O—, —S—, —SO$_2$—, —CH$_2$—, —C(O)—, —C(CH$_3$)$_2$—, —C(CF$_3$)$_2$—, —(CF$_2$)$_q$, q being an integer from 1 to 5.

Preferably, the aromatic polyamide-imide comprises more than 50% of recurring units ($R_{PAI}$) comprising an imide group in which the imide group is present as such, like in recurring units ($R_{PAI}$-a), and/or in its amic acid form, like in recurring units ($R_{PAI}$-b).

Recurring units ($R_{PAI}$) are preferably chosen from recurring units (l), (m) and (n), in their amide-imide (a) or amide-amic acid (b) forms:

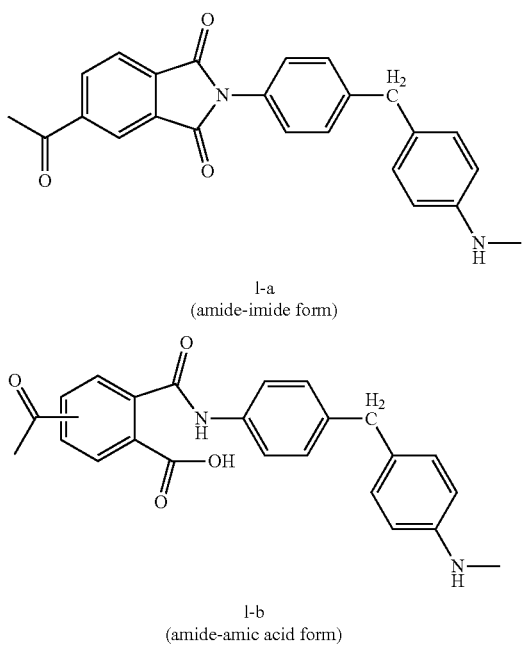

l-a
(amide-imide form)

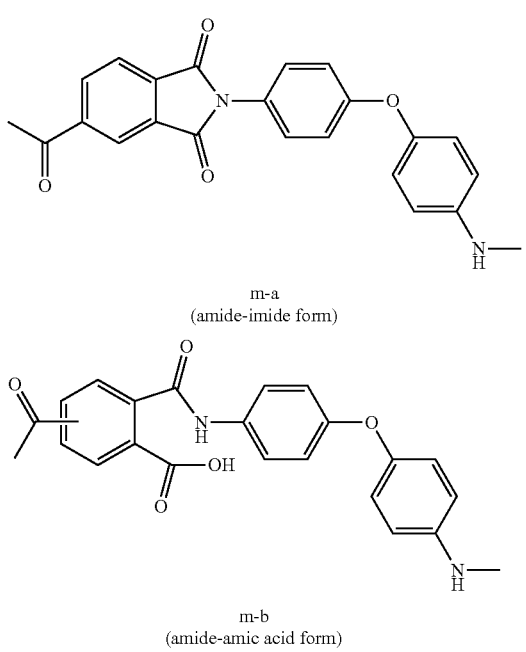

l-b
(amide-amic acid form)

wherein the attachment of the two amide groups to the aromatic ring as shown in (l-b) will be understood to represent the 1,3 and the 1,4 polyamide-amic acid configurations;

(m)

m-a
(amide-imide form)

m-b
(amide-amic acid form)

wherein the attachment of the two amide groups to the aromatic ring as shown in (m-b) will be understood to represent the 1,3 and the 1,4 polyamide-amic acid configurations; and

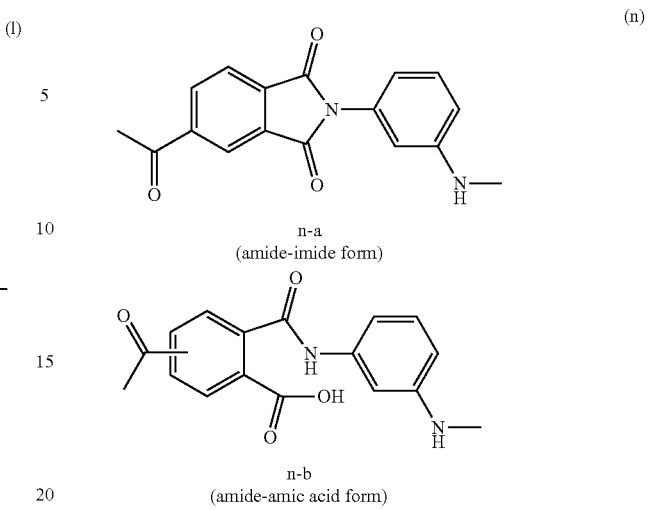

n-a
(amide-imide form)

n-b
(amide-amic acid form)

wherein the attachment of the two amide groups to the aromatic ring as shown in (n-b) will be understood to represent the 1,3 and the 1,4 polyamide-amic acid configurations.

More preferably, the polymer (PAI) comprises more than 90% moles of recurring units ($R_{PAI}$). Still more preferably, it contains no recurring unit other than recurring units ($R_{PAI}$). Polymers commercialized by Solvay Specialty Polymers USA, L.L.C. as TORLON® polyamide-imides comply with this criterion. Torlon® 4000T is an aromatic polyamide-imide polymer commercially available from Solvay Specialty Polymers USA, LLC.

The PAI polymer can be manufactured according to known methods in the art.

Examples of embodiments in which Z is a perfluoroelastomer include, but are not limited to, those represented by the following formulae:

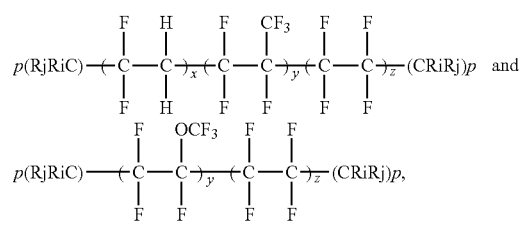

where $R_i$ and $R_j$, at each location are independently selected from the group consisting of a hydrogen for an alkyl group; p is an integer from 0 to 10; and x, y and z are independently selected integers from 1 to 100. Preferably, $R_i$ and $R_j$, at each location is H. Additionally or alternatively, preferably p is 1 to 4.

Examples of embodiments in which Z is a polyvinyl pyrrolidone include, but are not limited to, those represented by the following formula:

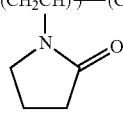

where $R_i$ and $R_j$, at each location is independently selected from the group consisting of a hydrogen or an alkyl group; and p is an integer from 0 to 10. Preferably, $R_i$ and $R_j$, at each location is a hydrogen. Additionally or alternatively, preferably p is from 1 to 4.

The PAES block copolymers above can be synthesized by reacting an isopropyl phthalate end-capped PAES polymer with an amine end-capped molecule or polymer Z: $H_2N$—Z—$NH_2$ or Z—$NH_2$. For example, ABA multiblock copolymers can be synthesized according to the following scheme.

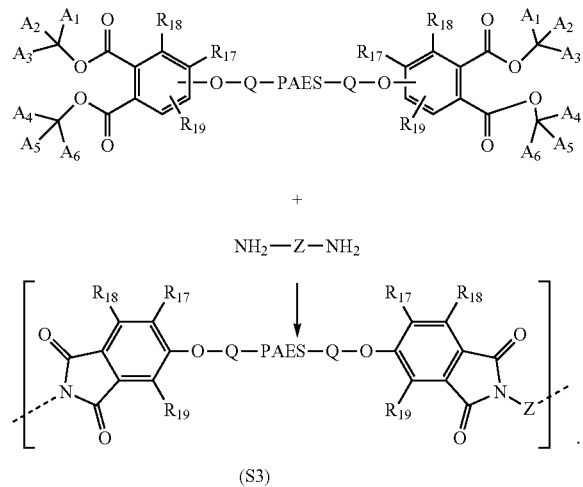

(S3)

ABA triblock copolymers can similarly be synthesized. However, in the case of ABA triblock copolymers, Z is end-capped with an amine on only one end (e.g. Z—$NH_2$). The reactions are generally carried out at a temperature of at least 280° C., though based upon the disclosure here, the person of ordinary skill in the art will be able to select suitable reaction temperatures empirically.

In some embodiments, the PAES block copolymer synthesis is carried out in the melt. In such embodiments, a powder of the dialkyl phthalate end-capped PAES polymer powder and a powder of the amine end-capped Z are blended in the absence of solvent and heated at a reaction temperature. The reaction temperature is generally selected to be higher than the glass transition temperature (for amorphous polymer blocks) or the melting point (for semi-crystalline polymer blocks). In some embodiments, the reaction temperature is selected to about 60° C. above the glass transition temperature or 20° C. about the melting point. In some embodiments, the reaction temperature from about 150° C. to about 400° C. In one embodiments, the PAES block copolymer synthesis is carried out in a melt mixer. Examples of melt mixers include, but are not limited to, extruders, Brabender mixers, and kneaders.

Polymer Blends

The PAES block-copolymers can be incorporated into polymer blends. The blends include from 1 wt. % to 30 wt. % of a PAES block copolymer (as described above) and from 70 wt. % to 30 wt. % of at least one thermoplastic polymer distinct from the PAES block copolymer. In some such embodiments, the thermoplastic polymer is selected to have the same backbone as (e.g. be the same as) Z in Formulae (6) and (7) above. In such embodiments, the polymer compositions include a blend of polymer Z along with the PAES block copolymer incorporating Z. Of course, in other embodiments, the thermoplastic polymer can be different than Z. Examples of desirable thermoplastic polymers include, but are not limited to, poly(aryl ether ketone) polymers, PAES, PEES, PEI and PAS.

Should the disclosure of any patents, patent applications, and publications which are incorporated herein by reference conflict with the description of the present application to the extent that it may render a term unclear, the present description shall take precedence.

EXAMPLES

The examples below demonstrate the synthesis of isopropyl phthalate end-capped PAES polymers as well as the synthesis of PAES block copolymers. For brevity of notation, the examples below reference "iPr" in the text and structure. iPr refers to "isopropyl." For example, —OiPr refers to —O—$CH(CH_3)_2$. Similarly, in the structures below, polymer may be referenced by their name. For example, A-PPSU-B refers to a PPSU polymer having an A bonded at one end of the polymer chain and a B bonded at the other end of the polymer chain. Additionally, end-capping conversion rate is determined by measuring the number of moles of reactive phenolic OH groups present before and after end capping the chain ends with the end capping agent. The end-capping conversion rate is then obtained by dividing the number of phenolic OH groups that reacted by the number of available phenolic OH groups present at the beginning of the reaction and multiplying by one hundred.

Example 1

Hydroxyl End-Capped PPSU

The present example demonstrates the synthesis of hydroxyl end-capped PPSU according to the following reaction scheme:

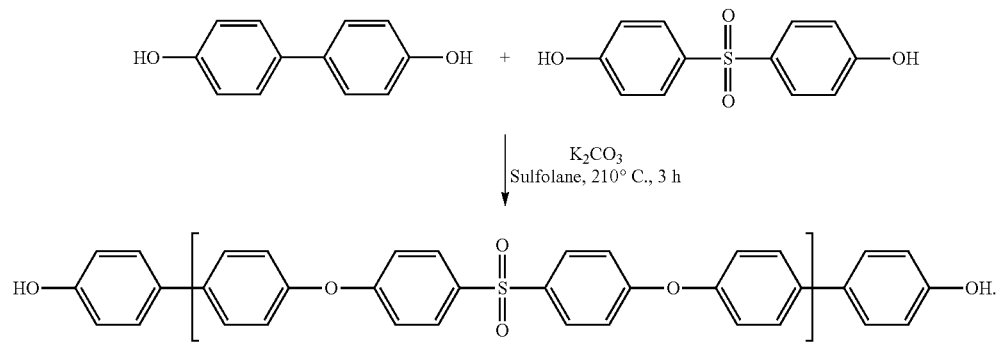

To synthesize the hydroxyl end-capped PPSU, 4,4'-dichlorodiphenyl sulfone (107.56 g, 0.375 mol, 1.00 equivalents), 4,4'-Biphenol (73.86 g, 0.397 mol, 1.06 equiv), $K_2CO_3$ (57.56 g, 0.417 mol, 1.11 equivalents), and sulfolane (350 g, 30 wt % solids) were combined into a 1 liter kettle equipped with a 4-neck kettle top, mechanical stirrer, a Dean-Stark trap wrapped with heat tape (~100° C.), and a nitrogen sparge tube. The resultant mixture was heated (~30 min) to 210° C. with stirring and low nitrogen flow and held at that temperature for 3.5 hours. During that time the reaction solution started as thick off-white slurry, then shifted to a bright gold/yellow color as the temperature exceeded 100° C. Throughout the polymerization the solution maintained the bright gold/yellow color and steadily became more viscous. After 3.5 hours of reaction time, the temperature was lowered to 150° C. and NMP (150 g) was added to dilute.

After dilution, the solution was pressure filtered at 50 psi through a glass fiber filter (2.7 micron pore size) to yield a completely transparent gold/yellow solution. This solution was then coagulated into hot $H_2O$ (2.5 L, ½ at a time) to produce a medium sized white powder. The powder solid was repeatedly washed with hot $H_2O$ (5×2.5 L), filtered, and rewashed with pure methanol (5×2.5 L) and the final product was collected via filtration and dried in a vacuum oven (110° C., 36 mmHg) for 16 h to yield the hydroxyl end-capped PPSU polymer (Mn~7,000 g/mol) as a white solid (135 g, 90%). This material was characterized by GPC using the polystyrene standard (Mn=9,640 g/mol, Mw=20,985 g/mol, PDI=2.18) and end group titration (Cl=6.8 ueq/g, PhOH=257 ueq/g). From the end group titration results, number average molecular weight was determined by titration (Mn=7,424 g/mol).

Example 2

Synthesis of Dialkyl Phthalate End-Capped PPSU Using 4-Chloro Isopropyl Phthalate The present example demonstrates the synthesis of isopropyl phthalate end-capped PPSU according to the following reaction scheme:

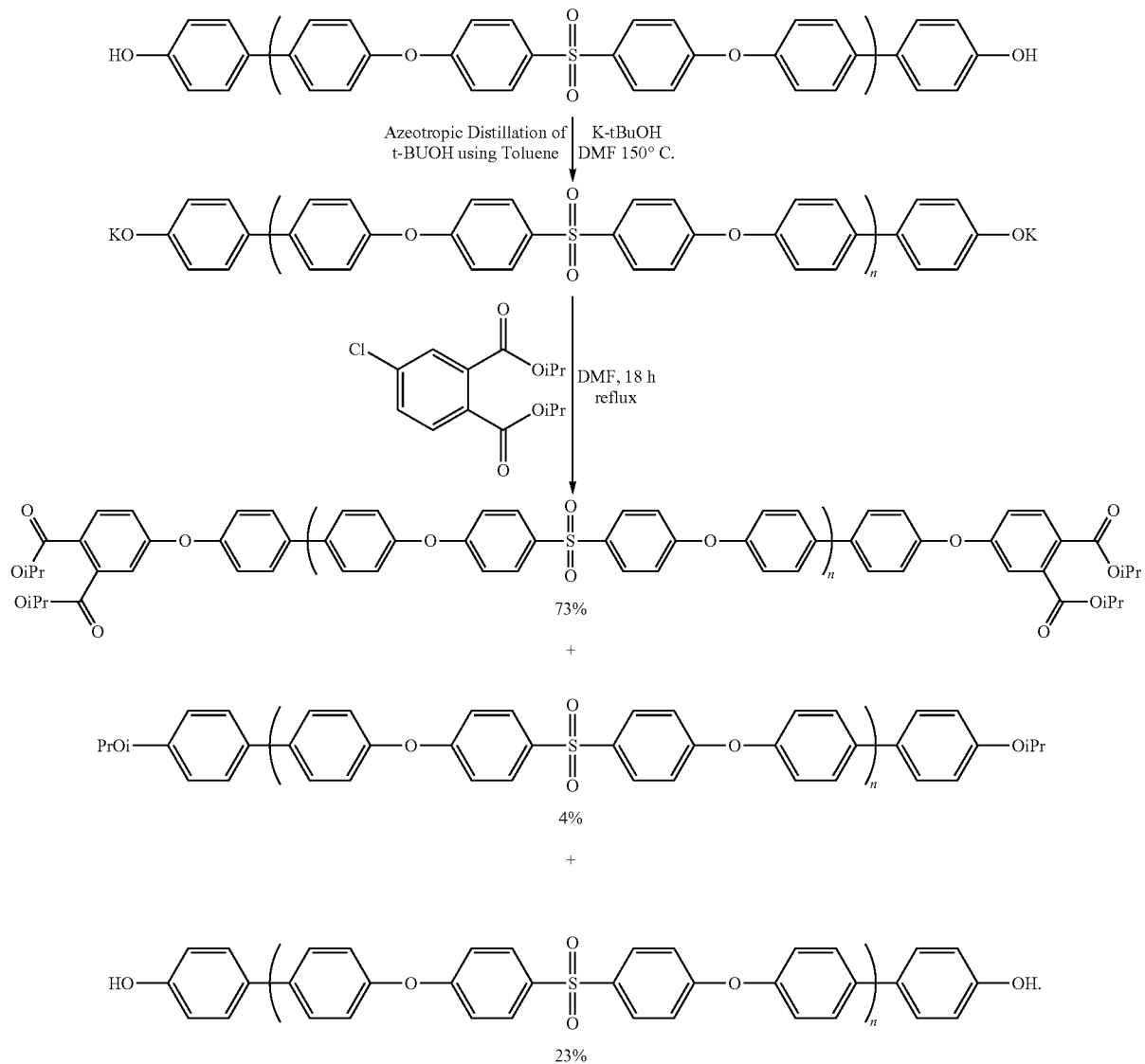

To synthesize the isopropyl phthalate end-capped PPSU, potassium tert-butoxide (0.401 g, 3.57 mmol, 1.25 eq to PhOH chain ends), hydroxyl end-capped PPSU (10 g) (from Example 1, Mn by titration=7,424 g/mol), and anhydrous dimethylformamide ("DMF") (49.2 g, 20 wt % solids) were combined into a 100 mL kettle with a 4-neck kettle top equipped with a mechanical stirrer, a Dean-Stark trap wrapped in thermal insulation cloth, and a nitrogen sparge tube. Subsequently, toluene (5 g, azeotroping agent) was added and the stirred mixture was heated to 150° C. to induce azeotropic distillation. After ~5 mL of toluene and tert-Butyl alcohol ("t-BuOH") were collected in the Dean-Stark trap, a second charge of toluene (5 mL) and fresh DMF (3 mL) was added to produce a second fraction in the Dean-Stark trap (5 mL). Following removal of the Dean-Stark trap and installation of a reflux-condenser in its place, 4-chloro isopropyl phthalate (synthesized according to methods disclosed in Chinese patent application publication number CN101016284A, incorporated herein by reference) (2.44 g, 8.59 mmol, 3 equiv to PhOK end groups) was added in one portion at 150° C. and the reaction was allowed to stir at reflux overnight (16 h).

Subsequently, the reaction was isolated via coagulation in a blender containing H₂O (500 mL), and the resultant white solid was collected using a Buchner funnel. The white solid was repeatedly washed with hot H₂O (3×500 mL), filtered, and rewashed with pure methanol (4×500 mL) and the final product was collected via filtration and dried in a vacuum oven (110° C., 36 mmHg) for 16 h to yield the isopropyl phthalate end-capped PPSU (Mn~7,000 g/mol) as a white solid (8 g, 79%). This material was characterized by end group titration (PhOH=58.3 ueq/g, 77% end group conversion), $^1$HNMR, and GPC using the polystyrene standard (Mn=10,639 g/mol Mw=23,691 g/mol, PDI=2.23). By end group titration, the end group conversion using 4-chloro isopropyl phthalate was 77%. $^1$HNMR analysis revealed that ~73% of these converted chain ends included the desired dimethyl phthalate ester groups, while the remaining 4% were due to alkylation to the corresponding phenyl isopropyl ether ("PhOiPr") groups. The remaining 23% was confirmed by $^1$HNMR to include unreacted phenolic chain ends (PhOH).

Example 3

Synthesis of Dialkyl Phthalate End-Capped PPSU Using 4-Fluoro Isopropyl Phthalate and Corresponding Anhydride Conversion The present example demonstrates the synthesis of isopropyl phthalate end-capped PPSU using 4-fluoro isopropyl phthalate according to the following reaction scheme:

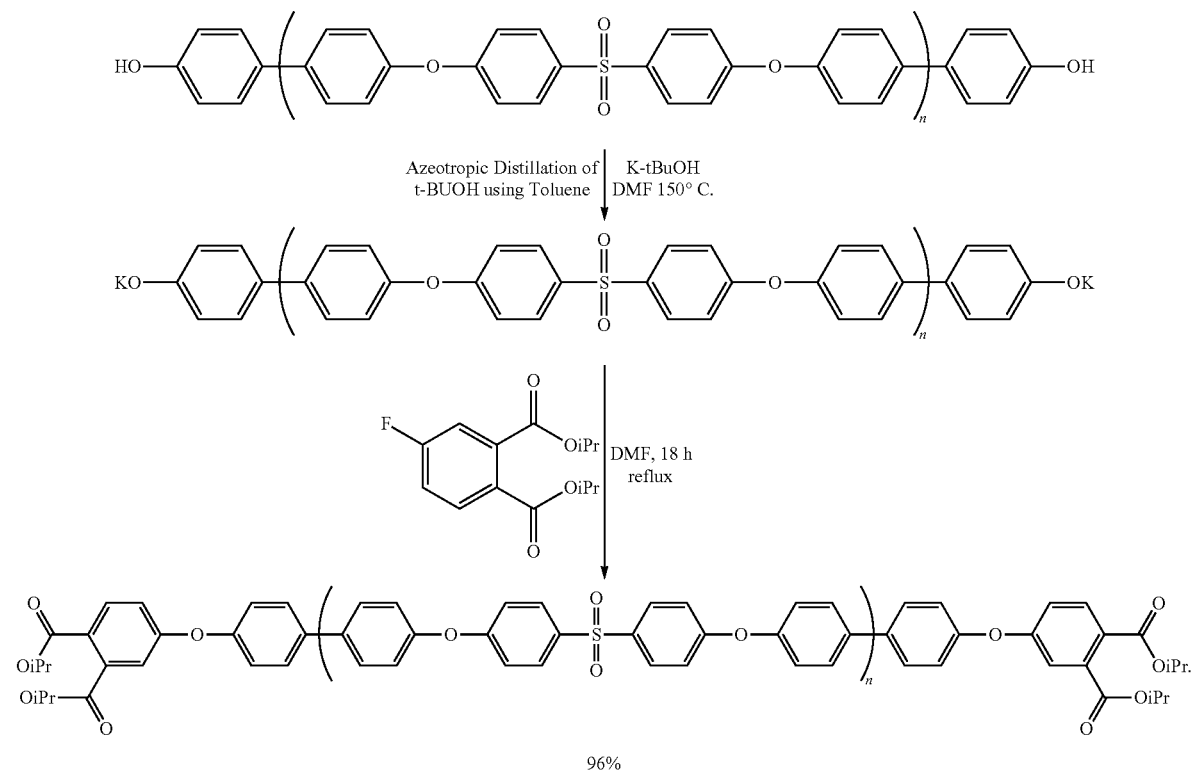

The present examples also demonstrates the thermal conversion of the isopropyl phthalate end-capped PPSU to the corresponding anhydride end-capped PPSU.

To synthesize the isopropyl phthalate end-capped PPSU, Potassium tert-butoxide (0.601 g, 5.36 mol, 1.25 eq to PhOH chain ends), hydroxyl end-capped PPSU (15 g) (from Example 1, Mn by titration=7,424 g/mol), and anhydrous DMF (73.80 g, 20 wt % solids) were combined into a 250 mL kettle with a 4-neck kettle top equipped with a mechanical stirrer, a Dean-Stark trap wrapped in thermal insulation cloth, and a nitrogen sparge tube. Subsequently, toluene (7 g, azeotroping agent) was added and the stirred mixture was heated to 150° C. to induce azeotropic distillation. After ~6 mL of toluene and t-BuOH were collected in the Dean-Stark trap, a second charge of toluene (5 mL) and fresh DMF (2 mL) was added to produce a second fraction in the Dean- Stark trap (5 mL). Following removal of the Dean-Stark trap and installation of a reflux-condenser in its place, 4-fluorodiisopropyl phthalate (3.45 g, 12.9 mmol, 3 equiv. to PhOK end groups) was added in one portion at 150° C. and the reaction was allowed to stir at reflux overnight (16 h).

Subsequently, the reaction was isolated via coagulation in a blender containing $H_2O$ (500 mL), and the resultant white solid was collected using a Buchner funnel. The white solid was repeatedly washed with hot $H_2O$ (3×500 mL), filtered, and rewashed with pure methanol (4×500 mL) and the final product was collected via filtration and dried in a vacuum oven (110° C., 36 mmHg) for 16 h to yield the isopropyl phthalate end-capped PPSU (Mn~7,000 g/mol) as a white solid (12 g, 80%). This material was characterized by end group titration (PhOH=12.2 ueq/g, 96% end group conversion), $^1$HNMR, and GPC using the polystyrene standard (Mn=10,777 g/mol Mw=22,582 g/mol, PDI=2.10). By end group titration, the end group conversion using 4-fluoro Isopropyl phthalate was 96%. $^1$HNMR analysis revealed that 96% of these converted chain ends included the desired dimethyl phthalate ester groups with low conversion to the corresponding phenyl isopropyl ether (PhOiPr) (less than 0.05%).

Thermal analysis by differential scanning calorimetry (DSC) of the isopropyl phthalate end-capped PPSU showed it was completely amorphous with a glass transition temperature ("Tg") of 204° C. Thermal gravimetric analysis showed a two-step decomposition profile with the first step occurring between 260° C. and 320° C. with a 2.5 wt. % loss. The second step started at 494° C. and accounted for a catastrophic 60 wt. % loss. Through a combination of $^1$HNMR analysis, quantification of theoretical weight loss (2.6%), and Thermal Desorption Mass Spectroscopy experiments, the thermal transition from 260° C. to 320° C. was attributed to the facile conversion of the isopropyl phthalate chain ends to the corresponding anhydride chain. The aforementioned result demonstrates a convenient method for producing the anhydride end-capped aromatic polymer from the corresponding isophthalate end-capped polymer via the following reaction scheme:

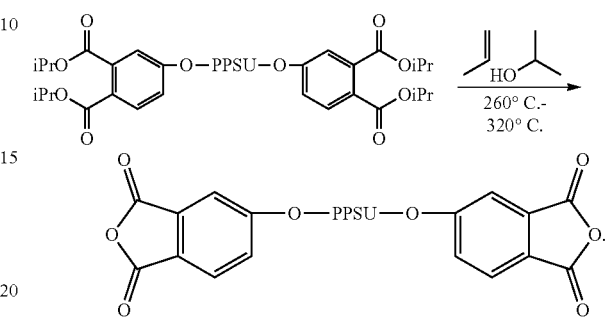

Example 4

Comparative Synthesis of Dimethyl Phthalate End-Capped PPSU Using 4-Chlorophthalate Methyl Ester The present example is a comparative example demonstrating the synthesis of methyl phthalate end-capped PPSU using a 4-chlorophthalate methyl ester end-capping agent according to the following reaction scheme:

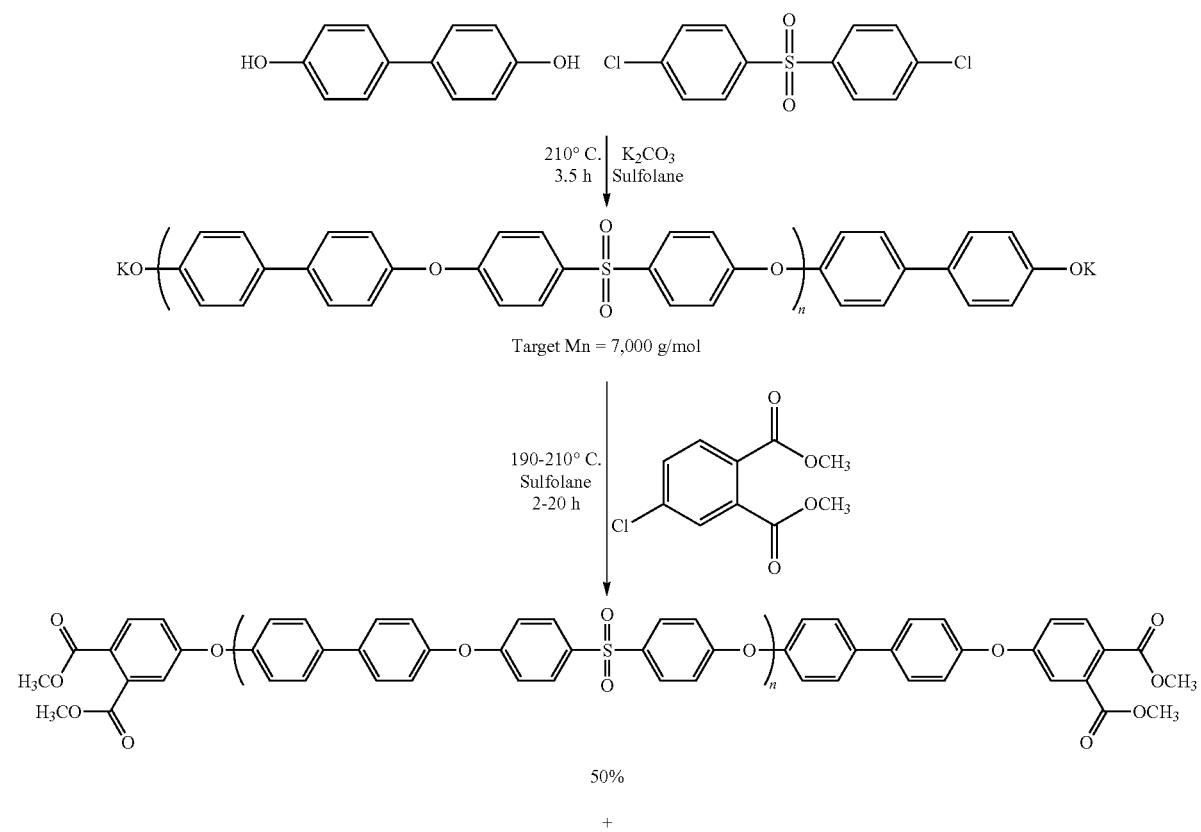

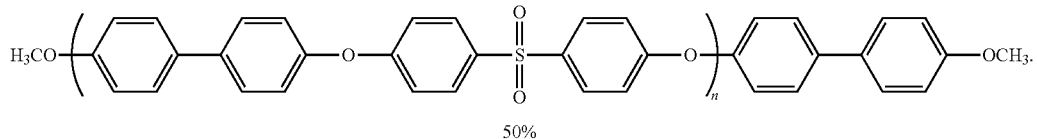

50%

To demonstrate the synthesis of methyl phthalate end-capped PPSU, 4,4'-dichlorodiphenyl sulfone (17.9 g, 0.062 mol, 1.00 eq), 4,4'-Biphenol (12.3 g, 0.066 mol, 1.06 eq), $K_2CO_3$ (9.59 g, 0.069 mol, 1.11 eq.), and sulfolane (70.50 g, 30 wt % solids) were combined into a 200 mL 3-neck round bottom flask equipped with a mechanical stirrer, a Dean-Stark trap wrapped in heat tape at 110° C., and a nitrogen inlet. The resultant mixture was heated to 210° C. (in 45 min) with stirring and low nitrogen flow and held at that temperature for 3 h. After the polymerization, 4-chlorodimethyl phthalate (6.73 g, 0.029 mol, 4.0 eq to hydroxy end groups) was added to the reaction vessel while at 210° C. and was allowed to stir for 3 h more. The reaction began to turn from a golden yellow color to a darker golden color after the addition of the end capper. The reaction temperature was then lowered to 190° C., and the reaction was allowed to continue overnight for 20 hours. The heat source was removed, and once the temperature lowered to ~150° C., more NMP (51 g) was then added to the reaction mixture and the solution was pressure filtered to remove the potassium salts. The reaction mixture was then coagulated in a blender containing 150 mL of a 50:50 mixture of methanol: H2O and the resultant white solid was collected by filtration. The coagulated powder was subsequently washed with hot $H_2O$ (3×500 mL), methanol (3×500 mL), ethanol (2×500 mL) and then dried in a vacuum oven (110° C., 36 mmHg) for 16 h to yield the final polymer as a white solid.

End group conversion of phenol chain ends was determined by end group titration where 96% conversion of the chain ends occurred (measured as loss of PhOH). Despite the apparent success of this reaction by end group titration, $^1$HNMR analysis revealed that only 50% of these converted chain ends included the desired dimethyl phthalate ester groups, while the remaining 50% were converted to phenyl methyl ether groups (~PhOMe) via a side reaction involving alkylation.

Example 5

Comparative Synthesis of Phthalic Anhydride End-Capped PAES Using 3-Fluorophthlaic Anhydride The present example is a comparative example demonstrating the synthesis of phthalic anhydride end-capped PPSU using direct functionalization with a 3-fluorophthalic anhydride end-capping agent according to the following reaction scheme:

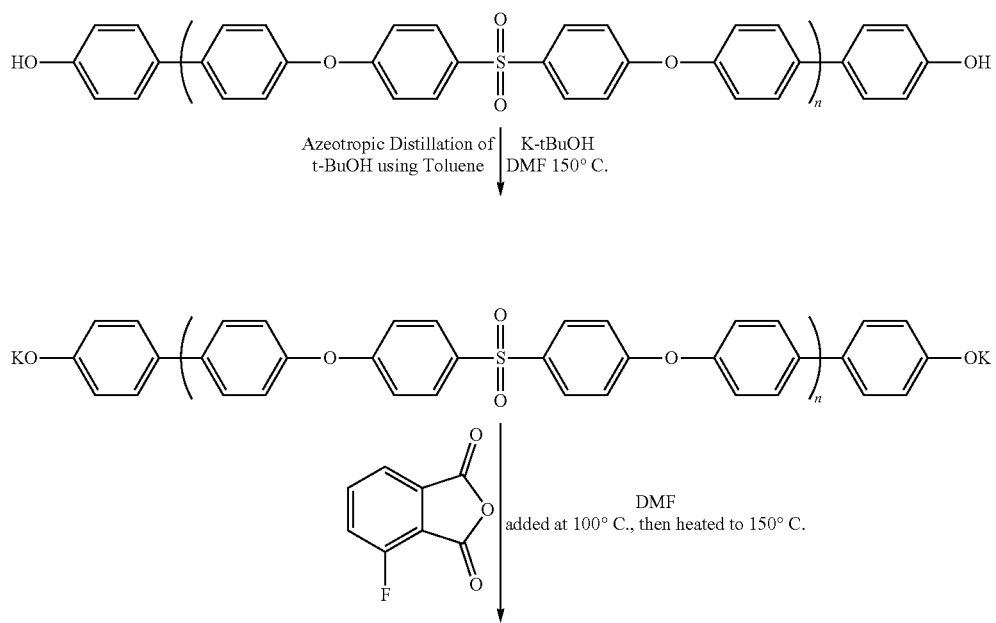

-continued

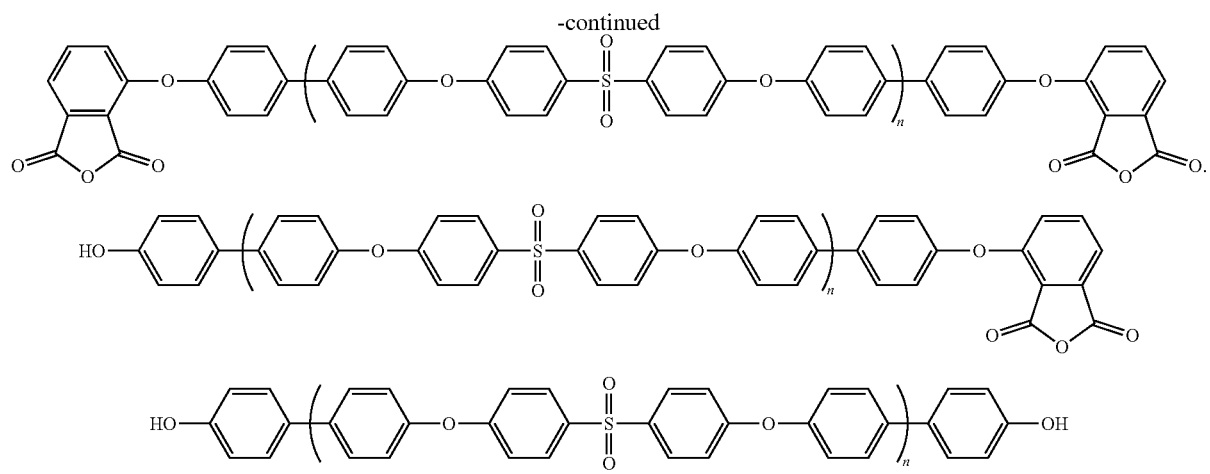

Mixture of end capped and PhOH chain ends.
Conversion of PhOH groups = 37%

To demonstrate the synthesis, Potassium tert-butoxide (0.200 g, 1.80 mmol, 1.25 eq to PhOH chain ends), hydroxyl terminated PPSU (5 g, 0.71 mmol) (Mn by titration=7,000 g/mol), and anhydrous DMF (15.6 g, 25 wt % solids) were combined into a 100 mL kettle with a 4-neck kettle top equipped with a mechanical stirrer, a Dean-Stark trap wrapped in thermal insulation cloth, and a nitrogen sparge tube. Subsequently, toluene (3 g, azeotroping agent) was added and the stirred mixture was heated to 150° C. to induce azeotropic distillation and held at that temperature ~1 h until ~4 mL of distillate was collected in the Dean-Stark trap. Following cooling to 100° C., removal of the Dean-Stark trap and installation of a reflux-condenser in its place, 3-fluorophthalic anhydride (1.42 g, 8.57 mmol, 6 equiv to PhOK end groups) was added in one portion and the reaction was reheated to 150° C. and allowed to stir for 6 h. Subsequently, the reaction was isolated via coagulation in a blender containing $H_2O$ (500 mL), and the resultant white solid was collected using a Buchner funnel. The white solid was repeatedly washed with hot $H_2O$ (3×500 mL), filtered, and rewashed with pure methanol (3×500 mL) and the final product was collected via filtration and dried in a vacuum oven (110° C., 36 mmHg) for 16 h to yield the final product as a yellow powder (4.5 g, 90%). This material was characterized by end group titration (PhOH=178.8 ueq/g, 37.4% end group conversion), $^1$HNMR, and GPC (Mn=10,392 g/mol Mw=22,633 g/mol, PDI=2.18). By end group titration, the end group conversion using 3-fluorophthalic anhydride was only 37.4%. $^1$HNMR analysis revealed that a significant number of unreacted PhOH chain ends were present in the final sample.

Example 6

Comparative Synthesis of Phthalic Anhydride End-Capped PAES Using 4-Fluorophthlaic Anydride The present example is a comparative example demonstrating the synthesis of phthalic anhydride end-capped PPSU using direct functionalization with a 4-fluorophthalic anhydride end-capping agent according to the following reaction scheme:

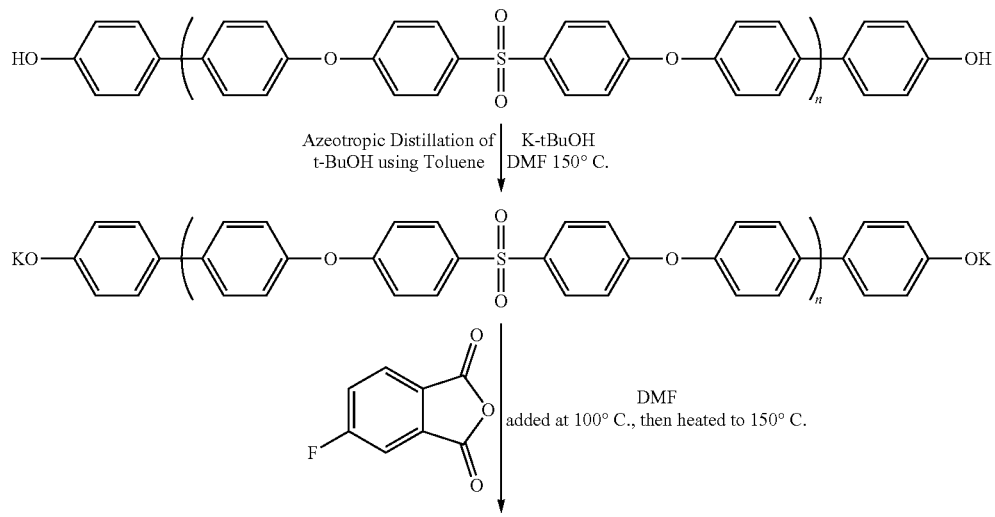

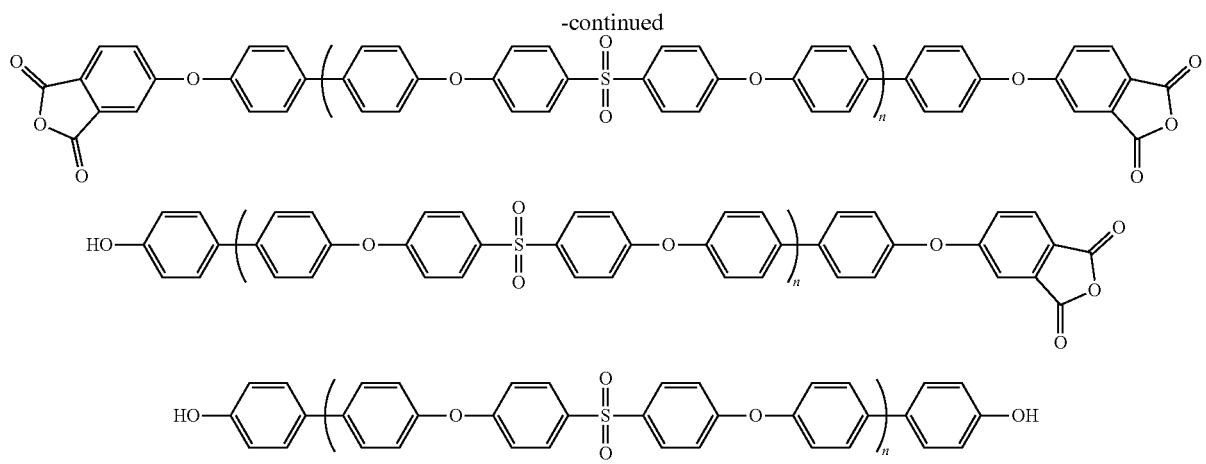

Mixture of end capped and PhOH chain ends.
Conversion of PhOH groups = 49%

To demonstrate synthesis, potassium tert-butoxide (0.200 g, 1.80 mmol, 1.25 eq to PhOH chain ends), hydroxyl terminated PPSU (5 g, 0.71 mmol) (Mn by titration=7,000 g/mol), and anhydrous DMF (15.6 g, 25 wt % solids) were combined into a 100 mL kettle with a 4-neck kettle top equipped with a mechanical stirrer, a Dean-Stark trap wrapped in thermal insulation cloth, and a nitrogen sparge tube. Subsequently, toluene (3 g, azeotroping agent) was added and the stirred mixture was heated to 150° C. to induce azeotropic distillation and held at that temperature ~1 h until ~4 mL of distillate was collected in the Dean-Stark trap. Following cooling to 100° C., removal of the Dean-Stark trap and installation of a reflux-condenser in its place, 4-fluorophthalic anhydride (1.42 g, 8.57 mmol, 6 equiv to PhOK end groups) was added in one portion and the reaction was reheated to 150° C. and allowed to stir for 4 h. Subsequently, the reaction was isolated via coagulation in a blender containing $H_2O$ (500 mL), and the resultant white solid was collected using a Buchner funnel. The white solid was repeatedly washed with hot $H_2O$ (3×500 mL), filtered, and rewashed with pure methanol (3×500 mL) and the final product was collected via filtration and dried in a vacuum oven (110° C., 36 mmHg) for 16 h to yield the final product as a light brown powder (4 g, 80%). This material was characterized by end group titration (PhOH=146.2 ueq/g, 49% end group conversion), $^1$HNMR, and GPC (Mn=9,884 g/mol Mw=22,304 g/mol, PDI=2.26). By end group titration, the end group conversion using 4-fluorophthalic anhydride was only 49%. $^1$HNMR analysis revealed that a significant number of unreacted PhOH chain ends were present in the final sample.

Example 7

Synthesis of PAES-Ethyleneglycol Block Copolymers

The present example demonstrates the synthesis of a PAES block copolymer from isopropyl phthalate end-capped PPSU and an ethylene glycol bis(3-aminopropyl) ether ("EGBAPE") according to the following scheme:

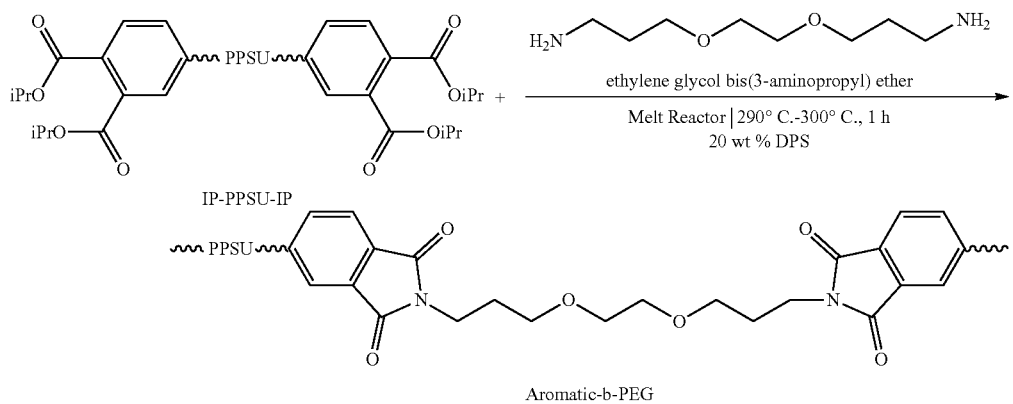

To demonstrate synthesis, isopropyl phthalate end-capped PPSU (6.60 g, 268.59 ueq/g reactive end groups), EGBAPE (0.156 g, 11,346.9 ueq/g reactive end groups), and diphenyl sulfone (1.68 g, 20 wt %) were combined into a 3-neck flask equipped with a mechanical stirrer, a nitrogen inlet, and a nitrogen outlet. This flask was then placed into a metal bath made of steel shot heating media and heated to 290° C. for 60 min with mechanical stirring of the resultant transparent, molten solid. Following heating, this material was collected from the 3-neck flask using a metal spatula while still flowing and placed into a glass vial to cool to room temperature. Evidence of block copolymer formation was established through a combination of GPC, FTIR, and NMR characterizations. The data demonstrated that block copolymerization took place to form the PPSU-b-EGBAPE block copolymer with full conversion of the PEG-amine and isopropyl ester moieties to imides with a high degree of chain extension.

Example 8

Synthesis of PAES-Aliphatic Diamine Block Copolymers

The present examples demonstrates the synthesis of a PAES block copolymer from isopropyl phthalate end-capped PPSU and an aliphatic diamine according to the following reaction scheme:

equipped with a mechanical stirrer, a nitrogen inlet, and a nitrogen outlet. This flask was then placed into a metal bath made of steel shot heating media and heated to 280° C. for 40 min with mechanical stirring of the resultant transparent, molten solid. Following heating, the material was collected from the 3-neck flask using a metal spatula while still flowing and placed into a glass vial to cool to room temperature. The resulting product included 7.4 g (90% yield) Priamine-b-PPSU block copolymer containing about 20 wt. % diphenyl sulfone plasticizer. Diphenyl sulfone was extracted from the resulting product by grinding extracting repeatedly with acetone. Block copolymerization was confirmed through a combination of GPC, FTIR, and $^1$HNMR characterizations.

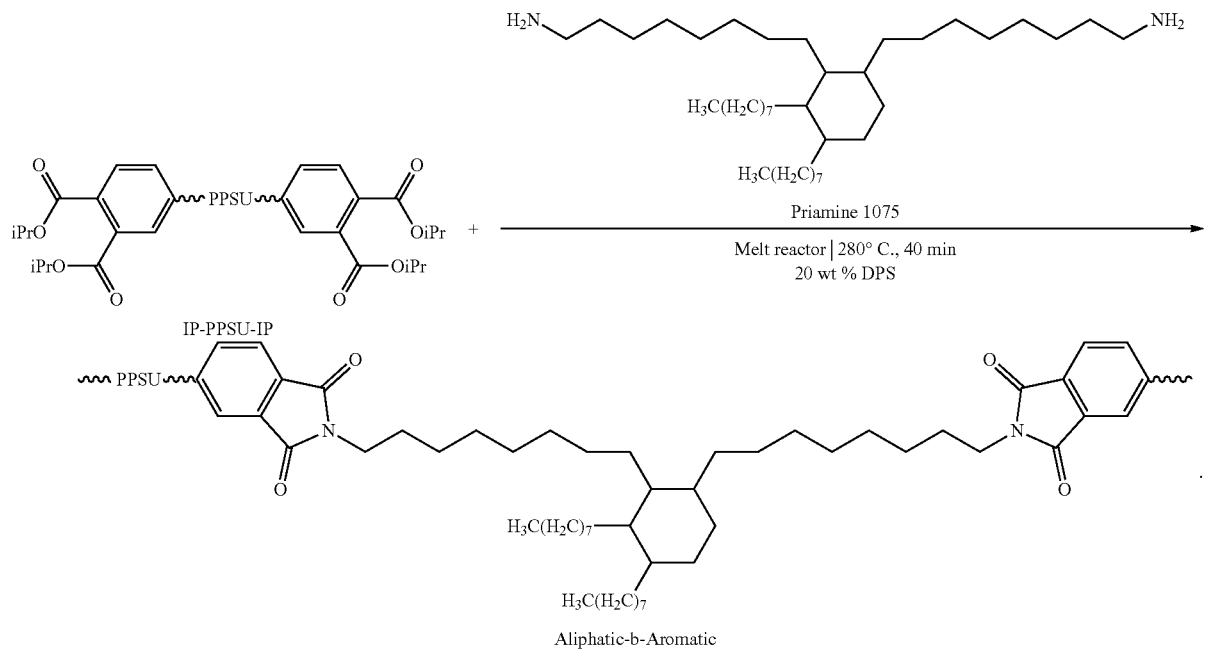

To demonstrate the synthesis, isopropyl phthalate end-capped PPSU (6.21 g, 215.9 ueq/g reactive end groups), aliphatic diamine (commercially available under the trade name Priamine™ 1075, from Croda International Plc.) (0.378 g, 3,552 ueq/g reactive end groups), and diphenyl sulfone (1.65 g, 20 wt %) were combined into a 3-neck flask

Example 9

Synthesis of PAES-PDMS Block Copolymers

The present example demonstrates the synthesis of a PAES block copolymer from isopropyl phthalate end-capped PPSU and an amine end-capped PDMS according to the following reaction scheme:

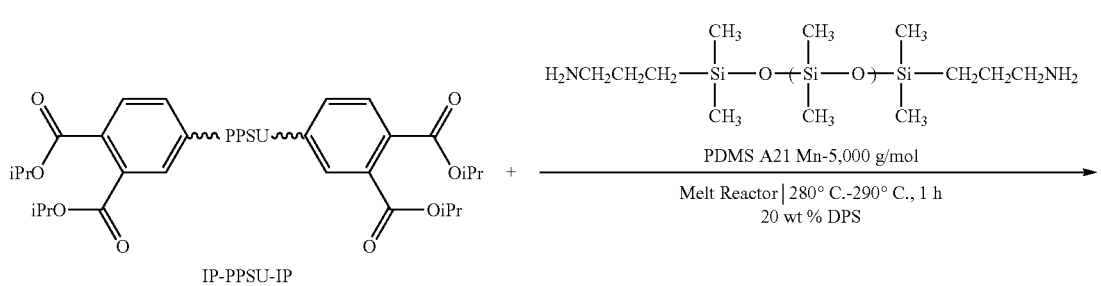

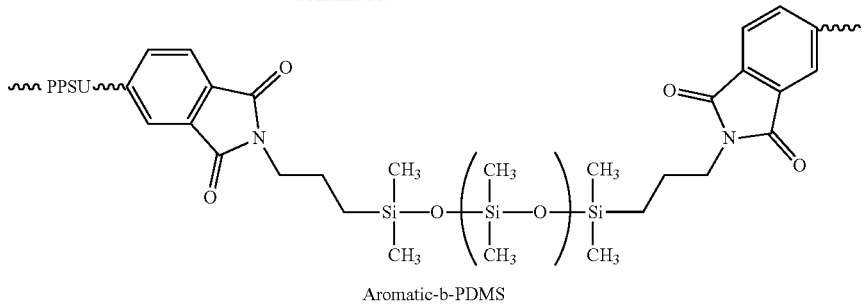

Aromatic-b-PDMS

To demonstrate synthesis, isopropyl phthalate end-capped PPSU (6.48 g, 277.19 ueq/g reactive end groups), PDMS A21 (4.49 g, 400 ueq/g reactive end groups), and diphenyl sulfone (2.74 g, 20 wt %) were combined into a 3-neck flask equipped with a mechanical stirrer, a nitrogen inlet, and a nitrogen outlet. This flask was then placed into a metal bath made of steel shot heating media and heated to 280° C. for 60 min with mechanical stirring of the resultant opaque white-beige, molten gum. Following heating, this material was collected from the 3-neck flask using a metal spatula while still flowing and placed into a glass vial to cool to room temperature. This afforded approximately (11.9 g, 87%) of PDMS-b-PPSU block copolymer containing about 20 wt. % diphenyl sulfone plasticizer. Partial block copolymerization was established by GPC using the polystyrene standard, FTIR, and NMR characterizations as described in FIG. 52 (GPC), FIG. 53 (FT-IR), and FIG. 54 (HNMR). The data demonstrated a significant degree of chain extention/imidization.

Example 10

Synthesis of PAES-PSU Block Copolymers Amine End-Capped Polysulfone

The present example demonstrates the synthesis of a PAES block copolymer from isopropyl phthalate end-capped PPSU and an amine end-capped polysulfone ("PSU") according to the following reaction scheme:

To demonstrate synthesis, isopropyl phthalate end-capped PPSU (5.0 g, 253 ueq/g reactive end groups), amine end-capped PSU (3.09 g, 410 ueq/g reactive end groups), and diphenyl sulfone (2.02 g, 20 wt %) were combined into a 3-neck flask equipped with a mechanical stirrer, a nitrogen inlet, and a nitrogen outlet. This flask was then placed into a metal bath made of steel shot heating media and heated to 280° C. for 60 min with mechanical stirring of the resultant dark transparent solid. Following heating, this material was collected from the 3-neck flask using a metal spatula while still flowing and placed into a glass vial to cool to room temperature. This afforded approximately (7.5 g, 75% conversion rate) of PSU-b-PPSU block copolymer containing about 20 wt. % diphenyl sulfone plasticizer. Evidence of partial block copolymerization was established through a combination of GPC, FTIR, and NMR characterizations.

Example 11

Synthesis of PAES-PEES Block Copolymers

The present example demonstrates the synthesis of a PAES block copolymer from isopropyl phthalate end-capped PPSU polymers and an amine end-capped PEES polymer according to the following reaction scheme:

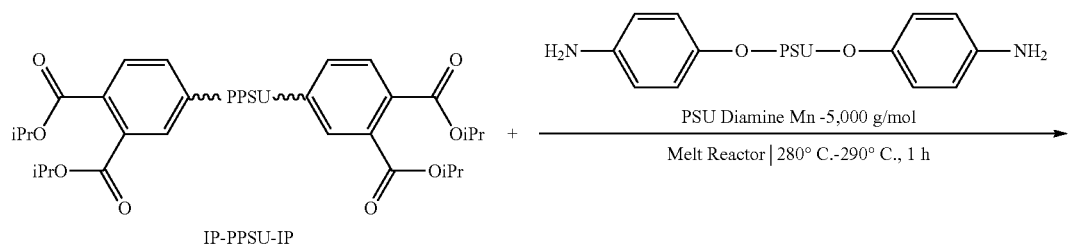

IP-PPSU-IP

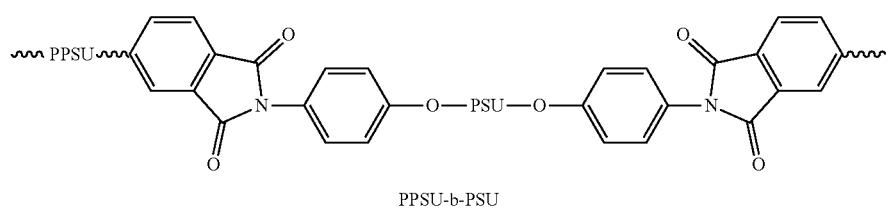

PPSU-b-PSU

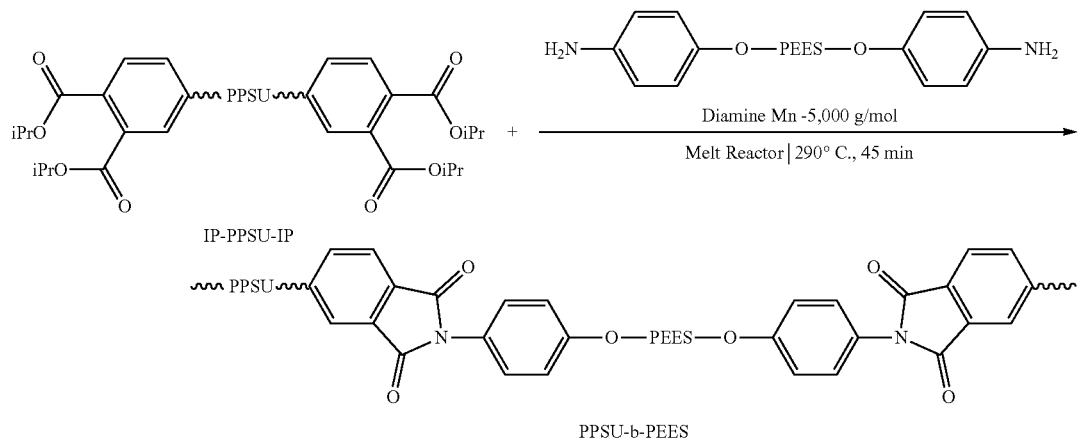

Isopropyl phthalate end-capped PPSU (6.0 g, 253 ueq/g reactive end groups), amine end-capped PEES (3.91 g, 388 ueq/g reactive end groups), and diphenyl sulfone (1.10 g, 10 wt %) were combined into a 3-neck flask equipped with a mechanical stirrer, a nitrogen inlet, and a nitrogen outlet. This flask was then placed into a metal bath made of steel shot heating media and heated to 290° C. for 45 min with mechanical stirring of the resultant dark transparent solid. Following heating, this material was collected from the 3-neck flask using a metal spatula while still flowing and placed into a glass vial to cool to room temperature. This afforded approximately (7.76 g, 78.3%) of PEES-b-PPSU block copolymer containing about 10 wt % diphenyl sulfone plasticizer. The diphenyl sulfone was effectively removed by extraction with acetone. Block copolymerization was established through a combination of GPC, FTIR, NMR, and TEM characterizations.

Example 12

Synthesis of PAES-Polyamide 6 Block Copolymers

The present example demonstrates end-capping an aliphatic polyamide 6 ("PA6") with a [1,1'-biphenyl]-4-yl-methanamine end-capping agent and the synthesis of a PAES block copolymer from isopropyl phthalate end-capped PPSU and PA.

End-capping the PA6 with a [1,1'-biphenyl]-4-ylmethanamine end-capping agent proceeded according to the following scheme:

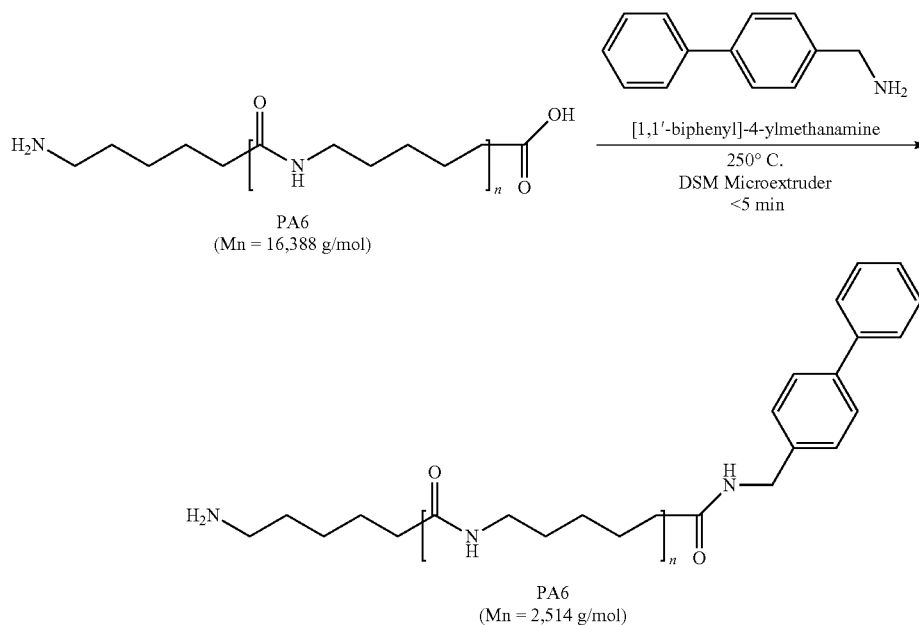

To demonstrate end-capping, PA6 rich in amine ends (Target Mn=2,000 g/mol) was first prepared by reacting PA6 (obtain from Solvay under the trade name Technyl®) with 4-phenylbenzylamine via reactive extrusion using a DSM Xplor® conical twin screw extruder. More specifically, PA6 (12 g, 16,388 g/mol by EGT, 0.106 mol caprolactam equivalents, 18 equiv) was dried overnight in a vacuum oven, then dry blended with 4-phenylbenzylamine (1.08 g, 0.006 mol, 1 equiv), and subsequently fed into the extruder, which was preheated to a melt temperature targeted to 250° C. (set temp=270° C.) and with a mixing rate of 200 rpm for approximately 4-5 min. Over the course of the reaction, a marked reduction in screw torque was observed starting at 600 N cm and ending at 200 N cm, indicating chain scission due to trans amidation of the PA6 polymer with the monofunctional 4-phenylbenzylamine. The stoichiometry of 18 equiv PA6 to 1 equiv 4-phenylbenzylamine was set to prepare an amine rich PA polymer with a molecular weight of 2,037 g/mol. Following extrusion, Gel Permeation Chromatography (GPC) and End Group Titration (EGT) data was collected to characterize the reduction in molecular weight and to define the number and type of chain ends present in the [1,1'-biphenyl]-4-ylmethanamine end-capped PA polymer. The new polyamide showed significant reduction in molecular weight by GPC and EGT which was accompanied by a strong increase in amine chain ends (By GPC, PA6: Mn=15,207 g/mol, Mw=45,722 g/mol, PDI=3.01. Amine end-capped PA6: Mn=8,688 g/mol, Mw=16,524 g/mol, PDI=1.90. By EGT, PA6: COOH ends=69 ueq/g, $NH_2$ ends=53 ueq/g, Mn=16,388 g/mol. Amine end-capped PA6: COOH ends=95 ueq/g, $NH_2$ ends=303 ueq/g, Mn=2,514 g/mol).

The synthesis of the block copolymer from isopropyl phthalate end-capped PPSU and PA according to the following scheme:

spatula while it was still flowing and placed into a glass vial to cool to room temperature. The process afforded approximately (9 g, 82%) of PA6-b-PPSU-b-PA6 ABA block copolymer that was insoluble in HFIP, DMAc (with 1 N LiBr), and DMF.

Evidence of block copolymerization was established through a combination of DSC, FTIR, and TEM. NMR was not possible due to the insolubility of the block copolymer. By DSC, the amine rich PA6 sample had a melting point (Tm) of 221° C. with a melt enthalpy (DH) of 70 J/g. While the ABA block copolymer, PA6-b-PPSU-b-PA6, had a melting point (Tm) of 215° C. and a melt enthalpy of 27 J/g. The lower Tm for the block copolymer is indicative of smaller crystallite domains which would be expected for the block copolymer due to decreased chain mobility (ability to organize) during crystallization. While the melt enthalpy for the block copolymer is about 39% of the melt enthalpy for the amine rich PA6 sample (27 J/g vs 70 J/g) which roughly correlates to a value slightly lower than the amount of PA6 in the total sample (5.01 g/11.0 g=45%). This is consistent with the block copolymer being constrained in its ability to crystallize relative to the amine rich PA6. FTIR confirmed conversion from the isopropyl ester to the corresponding aryl imide conversion of the C=O stretches for the isopropyl esters at 1720 cm-1 which is split into two new signals at 1711 cm-1 and 1770 cm-1 for the C=O of the aryl imide. These frequencies are consistent with those published in the

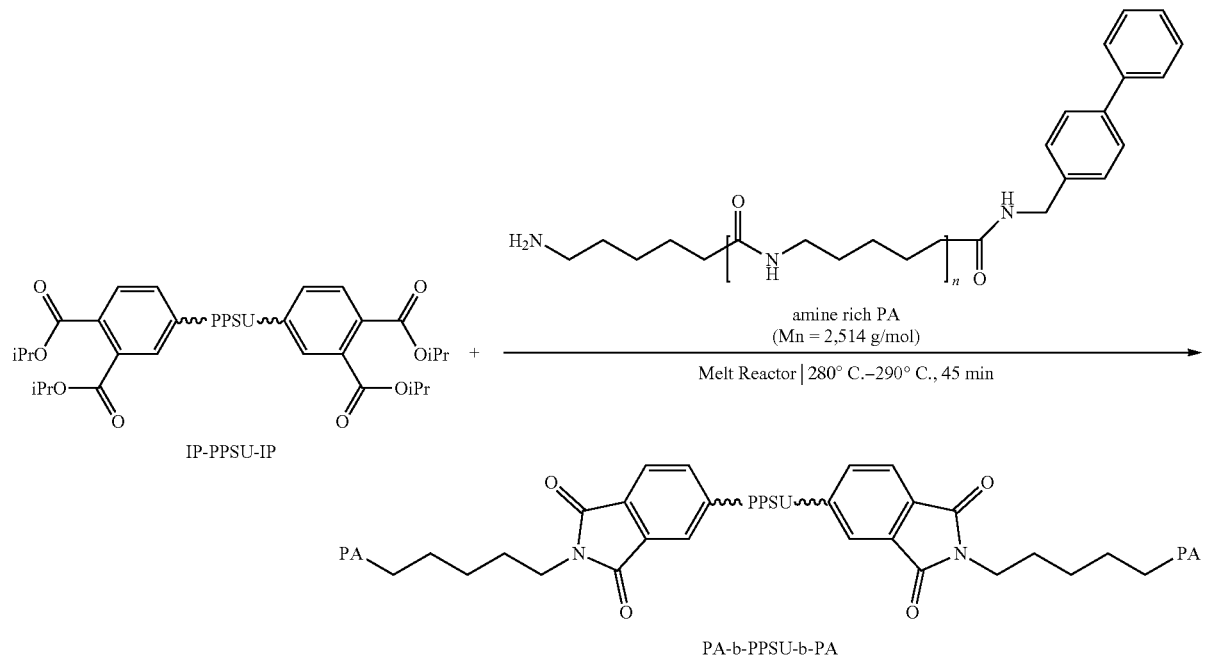

To demonstrate the synthesis, isopropyl phthalate end-capped PPSU (6.00 g, 253.0 ueq/g reactive end groups) and amine rich PA6 (5.01 g, 303 ueq/g reactive end groups), were combined into a 3-neck flask equipped with a mechanical stirrer, a nitrogen inlet, and a nitrogen outlet. This flask was then placed into a metal bath made of steel shot heating media and heated to 280° C. for 45 min with mechanical stirring of the resultant, molten gum which shifted in appearance from opaque beige to partially transparent over the course of the reaction. Subsequently, the aforementioned material was collected from the 3-neck flask using a metal literature for alkyl arylimides which confirms the imide bond is generated via reaction with the aliphatic amine. By TEM, the PA6-b-PPSU-b-PA6 block copolymer showed spherical or cylindrical microphase separation with domain sizes smaller than 200 nm. This is consistent with a self-assembled morphology of a block copolymer comprised of two immiscible block segments.

Further Inventive Concepts

1. A PAES block copolymer, wherein the block copolymer is represented by the following formula:

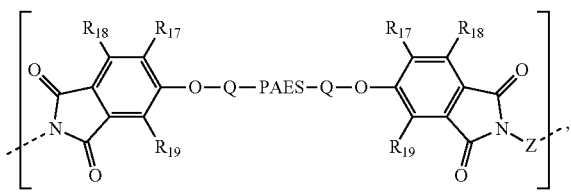

wherein
R$_{17}$ to R$_{19}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, (where each R$_a$ and R$_b$, are independently selected from the group consisting of a hydrogen, a C$_1$-C$_{12}$-alkyl, a C$_1$-C$_{12}$-alkoxy, and a C$_6$-C$_{18}$-aryl group); —(CH$_2$)$_m$— and —(CF$_2$)$_m$— (where m is an integer from 1 to 6); an aliphatic divalent group, linear or branched, of up to 6 carbon atoms; and combinations thereof; and Z is selected from the group consisting of alkanes and polyolefins, polydimethylsiloxanes ("PDMS"), polyalkylene oxides ("PAO"), perfluoroelastomers, polyvinyl pyrrolidones, polyamides, poly(aryl ether sulfones) ("PAES"), polyetherimides ("PEI"), polyimides, polyamideimides ("PAI"), and a poly(ether ether sulfones) ("PEES"), preferably from the group consisting of polyamides, PAES, PAI, and PEI.

2. The PAES block copolymer of inventive concept 1, wherein Z is an aliphatic polyamide selected from the group consisting of: PA6; PA11; PA12; PA 6,6; PA6,10; PA10,10; PA10,6; PA6,12; PA12,12; PA10,12; and PA12,10.

3. The PAES block copolymer of inventive concept 1, wherein Z is a semi-aromatic polyamide selected from the group consisting of PA4,T; PA5,T; PA6,T; PA8,T; PA9,T; PA10,T; PA 12,T; PA4,I; PA5,I; PA6,I; PA8,T; PA9,I; PA10, I, PA12,I; PA6,I/6,6; PA6,T/6,6; PA6,T/6,I/6,6; PA9T/8T; MXD10, PXD6 and PXD10.

4. A polymer composition including from 1 wt. % to 30 wt. % of the PAES block copolymer according to any one of inventive concepts 1 to 3 and from 70 wt. % to 99 wt. % of a thermoplastic polymer distinct from the PAES block copolymer.

5. The polymer composition of inventive concept 4, wherein the thermoplastic polymer is selected form the group consisting of poly(aryl ether ketone)s, PAES, PEES, PEI and PAS.

6. A PAES block copolymer, wherein the block copolymer is represented by the following formula:

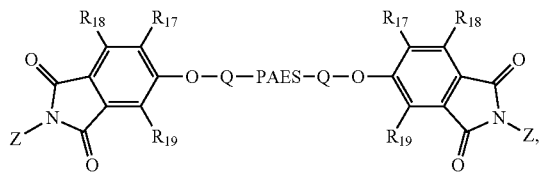

wherein
R$_{17}$ to R$_{19}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

R$_{20}$ is an aromatic or aliphatic alkyl group;

T is selected from the group consisting of a bond, —CH$_2$—; —O—; —SO$_2$—; —S—; —C(O)—; —C(CH$_3$)$_2$—; —C(CF$_3$)$_2$—; —C(=CCl$_2$)—; —C(CH$_3$)(CH$_2$CH$_2$COOH)—; —N=N—; —R$_a$C=CR$_b$—, (where each R$_a$ and R$_b$, are independently selected from the group consisting of a hydrogen, a C$_1$-C$_{12}$-alkyl, a C$_1$-C$_{12}$-alkoxy, and a C$_6$-C$_{18}$-aryl group); —(CH$_2$)$_m$— and —(CF$_2$)$_m$— (where m is an integer from 1 to 6); an aliphatic divalent group, linear or branched, of up to 6 carbon atoms; and combinations thereof; and Z is selected from the group consisting of alkanes and polyolefins, polydimethylsiloxanes ("PDMS"), polyalkylene oxides ("PAO"), perfluoroelastomers, polyvinyl pyrrolidones, polyamides, poly(aryl ether sulfones) ("PAES"), polyetherimides ("PEI"), polyimides, polyamideimides ("PAI"), and a poly(ether ether sulfones) ("PEES"), preferably from the group consisting of polyamides, PAES, PAI, and PEI.

7. The PAES block copolymer of inventive concept 6, wherein Z is an aliphatic polyamide selected from the group consisting of: PA6; PA11; PA12; PA 6,6; PA6,10; PA10,10; PA10,6; PA6,12; PA12,12; PA10,12; and PA12,10.

8. The PAES block copolymer of inventive concept 6, wherein Z is a semi-aromatic polyamide selected from the group consisting of PA4,T; PA5,T; PA6,T; PA8,T; PA9,T; PA10,T; PA 12,T; PA4,I; PA5,I; PA6,I; PA8,T; PA9,I; PA10, I, PA12,I; PA6,I/6,6; PA6,T/6,6; PA6,T/6,I/6,6; PA9T/8T; MXD6, MXD10, PXD6 and PXD10.

9. A polymer composition including from 1 wt. % to 30 wt. % of the PAES block copolymer according to any one of inventive concepts 6 to 8 and from 70 wt. % to 99 wt. % of a thermoplastic polymer distinct from the PAES block copolymer.

10. The polymer composition of inventive concept 9, wherein the thermoplastic polymer is selected form the group consisting of poly(aryl ether ketone)s, PAES, PEES, PEI and PAS.

The invention claimed is:
1. A dialkyl phthalate end-capped poly(aryl ether sulfone) ("PAES") polymer comprising: a recurring unit R$_{PAES}$ represented by the following formula:

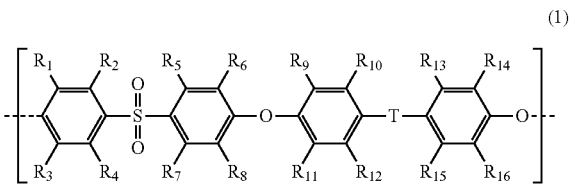

wherein
R$_1$ to R$_{16}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

T is selected from the group consisting of a bond, —$CH_2$—; —O—; —$SO_2$—; —S—; —C(O)—; —$C(CH_3)_2$—; —$C(CF_3)_2$—; —$C(=CCl_2)$—; —$C(CH_3)(CH_2CH_2COOH)$—; —N=N—; —$R_aC=CR_b$—; —$(CH_2)_m$—; —$(CF_2)_m$—; an aliphatic divalent group, linear or branched, of up to 6 carbon atoms; and combinations thereof;

where in —$R_aC=CR_b$—, each $R_a$ and $R_b$ are independently selected from the group consisting of a hydrogen, a $C_1$-$C_{12}$-alkyl, a $C_1$-$C_{12}$-alkoxy, and a $C_6$-$C_{18}$-aryl group, where in —$(CH_2)_m$— and —$(CF_2)_m$—, m is an integer from 1 to 6; and at least at one end of the PAES polymer chain, a dialkyl phthalate radical represented the following formula:

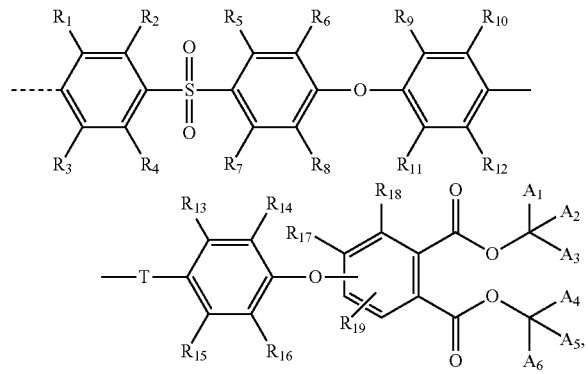

wherein $R_{17}$ to $R_{19}$ are independently selected from the group consisting of a hydrogen and a $C_1$ to $C_{18}$, substituted or unsubstituted, alkyl group;

$A_1$, $A_2$, $A_4$, and $A_5$, are independently selected from the group consisting of alkyl groups represented by the formula: —$(CH_2)_nCH_3$, where n is an integer from 0 to 12;

$A_3$ and $A_6$ are independently selected form the group consisting of H and an alkyl group represented by the formula: —$(CH_2)_{n'}CH_3$, where n' is an integer from 0 to 12 and $R_1$ to $R_{16}$ and T are the same as defined above with respect to recurring unit $R_{PAES}$, wherein at least 75% of the PAES polymer chain ends comprise the dialkyl phthalate radical.

2. The end-capped PAES polymer of claim 1, wherein T is selected from the group consisting of a bond, —$C(CH_3)_2$—, and —$SO_2$—.

3. The end-capped PAES polymer of claim 1, wherein the PAES polymer has a number average molecular weight of at most about 25,000 g/mol as measured by gel permeation chromatography ("GPC") using methylene chloride as a mobile phase, with polystyrene standards.

4. The end-capped PAES polymer of claim 1, wherein the PAES polymer has a number average molecular weight of at least 1,000 g/mol.

5. A method for synthesizing the end-capped PAES polymer of claim 1, the method comprising:

reacting, in the presence of a base and solvent, an hydroxyl terminated PAES polymer comprising recurring unit $R_{PAES}$ and, at least at one end of the PAES polymer chain, a hydroxyl end-capping unit represented by the following formula:

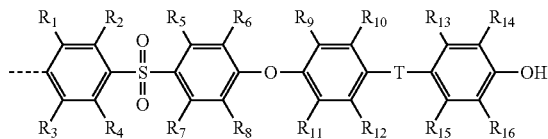

with a halophthalic dialkyl ester end-capping agent represented by the following formula

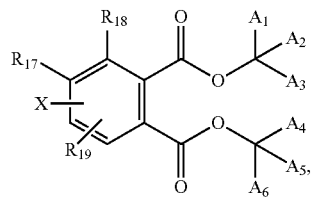

where X is Cl or F.

6. The method of claim 5, wherein the halophthalic dialkyl ester is a fluorophthalic diisopropyl ester.

7. The method of claim 5, wherein the base is selected from the group consisting of potassium t-butoxide, sodium t-butoxide, cesium t-butoxide, sodium isopropoxide, potassium isopropoxide, cesium isopropopoxide, 1,8-diazabicycloundec-7-ene ("DBU"), 1,5-Diazabicyclo(4.3.30)non-5-ene ("DBN"), N,N-diisopropylethylamine ("DIPEA"), sodium hydride, potassium hydride, sodium metal, potassium metal, $K_2CO_3$, $Na_2CO_3$, $Cs_2CO_3$, and triethyl amine.

8. The method of claim 5, wherein the solvent is a polar aprotic solvent having a boiling point of more than 200° C.

9. The method of claim 8, wherein the solvent is selected from the group consisting of dimethylformamide ("DMF"), dimethylacetamide ("DMAC"), N-methylpyrrolidone ("NMP"), hexamethylphosporic triamide ("HMPA"), dimethyl sulfoxide ("DMSO"), and sulfolane.

10. A method for synthesizing a PAES polymer end-capped with a phthalic anhydride radical at least at one end of the PAES polymer, the method comprising heating, at a temperature from about 250° C. to about 500° C., the dialkyl phthalate end-capped PAES polymer of claim 1.

11. A method for synthesizing a PAES block copolymer, the method comprising reacting, in a melt, the end-capped PAES polymer of claim 1 with an amine end-capped polymer represented by a formula $H_2N$—Z—$NH_2$ or Z—$NH_2$, where Z is selected from the group consisting of alkanes and polyolefins, polydimethylsiloxanes ("PDMS"), polyalkylene oxides ("PAO"), perfluoroelastomers, polyvinyl pyrrolidones, polyamides, poly(aryl ether sulfones), polyetherimides ("PEI"), polyimides, polyamideimides ('PAI"), and a poly(ether ether sulfones) ("PEES").

12. The method of claim 11, wherein the PAES block copolymer is an AB multiblock copolymer.

13. The method of claim 11, wherein the PAES block copolymer is an ABA triblock copolymer.

14. A PAES block copolymer, wherein the block copolymer is represented by the following formula:

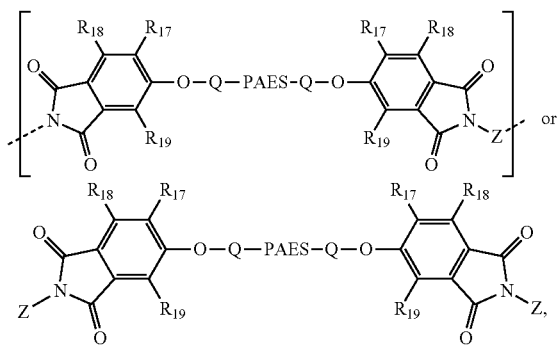

wherein
$R_{17}$ to $R_{19}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

Q is represented by the following formula:

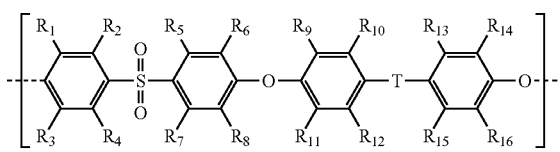

wherein $R_1$ to $R_{16}$ are independently selected from the group consisting of a hydrogen, a halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;

T is selected from the group consisting of a bond, —CH$_2$—; —O—; —SO$_2$—; —S—; —C(O)—; —C(CH$_3$)$_2$—; —C(CF$_3$)$_2$—; —C(CH$_3$)(CH$_2$CH$_2$COOH)—; —N=N—; —R$_a$C=CR$_b$; —(CH$_2$)$_m$—; —(CF$_2$)$_m$—; an aliphatic divalent group, linear or branched, of up to 6 carbon atoms; and combinations thereof;

where in —R$_a$C=CR$_b$—, each R$_a$ and R$_b$, are independently selected from the group consisting of a hydrogen, a C$_1$-C$_{12}$-alkyl, a C$_1$-C$_{12}$-alkoxy, and a C$_6$-C$_{18}$-aryl group, and where in —(CH$_2$)$_m$— and —(CF$_2$)$_m$—, m is an integer from 1 to 6; and Z is selected from the group consisting of alkanes and polyolefins, polydimethylsiloxanes ("PDMS"), polyalkylene oxides ("PAO"), perfluoroelastomers, polyvinyl pyrrolidones, polyamides, poly(aryl ether sulfones) ("PAES"), polyetherimides ("PEI"), polyimides, polyamideimides ('PAI"), and a poly(ether ether sulfones) ("PEES").

15. The PAES block copolymer of claim 14, wherein T is selected from the group consisting of a bond, —C(CH$_3$)$_2$—, and —SO$_2$—.

16. The PAES block copolymer of claim 14, wherein Z is selected from the group consisting of polyamides, poly(aryl ether sulfones) ("PAES"), polyetherimides ("PEI"), polyamideimides (TAT") and poly(ether ether sulfones) ("PEES").

17. The PAES block copolymer of claim 14, wherein Z is a polyamide selected from the group consisting of: PA6; PA11; PA12; PA 6,6; PA6,10; PA10,10; PA10,6; PA6, 12; PA12,12; PA10,12; and PA12,10, or
a semi-aromatic polyamide selected from the group consisting of PA4,T; PA5,T; PA6,T; PA8,T; PA9,T; PA10,T; PA 12,T; PA4,I; PA5,I; PA6,I; PA8,T; PA9,I; PA10,I; PA12,I; PA6,I/6,6; PA6,T/6,6; PA6,T/6,I/6,6; PAST/8T; MXD6, MXD10, PXD6 and PXD10.

18. A polymer composition including from 1 wt. % to 30 wt. % of the PAES block copolymer according to claim 14 and from 70 wt. % to 99 wt. % of a thermoplastic polymer distinct from the PAES block copolymer.

* * * * *